US012744558B2

(12) United States Patent
Nobbe

(10) Patent No.: US 12,744,558 B2
(45) Date of Patent: Sep. 22, 2026

(54) METHODS AND SYSTEMS FOR IMPLEMENTING AND USING DUAL-MODE RADAR AND COMMUNICATIONS DEVICES

(71) Applicant: MatrixSpace, Inc., Burlington, MA (US)

(72) Inventor: Dan William Nobbe, Crystal Lake, IL (US)

(73) Assignee: MatrixSpace, Inc., Burlington, MA (US)

( * ) Notice: Subject to any disclaimer, the term of this patent is extended or adjusted under 35 U.S.C. 154(b) by 260 days.

(21) Appl. No.: 18/607,879

(22) Filed: Mar. 18, 2024

(65) Prior Publication Data

US 2025/0219673 A1 Jul. 3, 2025

Related U.S. Application Data

(60) Provisional application No. 63/452,983, filed on Mar. 17, 2023, provisional application No. 63/452,979, filed on Mar. 17, 2023.

(51) Int. Cl.

| | |
|---|---|
| ***H04B 1/403*** | (2015.01) |
| ***G01S 13/34*** | (2006.01) |
| ***H01Q 21/06*** | (2006.01) |
| ***H04L 5/14*** | (2006.01) |

(52) U.S. Cl.

CPC .............. *H04B 1/406* (2013.01); *G01S 13/34* (2013.01); *H01Q 21/061* (2013.01); *H04L 5/14* (2013.01)

(58) Field of Classification Search

CPC . H04B 1/406; G01S 13/34; G01S 2013/0245; G01S 7/032; G01S 13/87; G01S 7/023; G01S 7/006; H01Q 21/061; H01Q 1/28; H04L 5/14

See application file for complete search history.

(56) References Cited

U.S. PATENT DOCUMENTS 12,490,114 B1 * 12/2025 Nobbe ................ H04B 17/336

* cited by examiner

*Primary Examiner* — Diane D Mizrahi

(74) *Attorney, Agent, or Firm* — Ryan, Mason & Lewis, LLP

(57) ABSTRACT

Systems and methods are provided for implementing and using dual-mode radar and communications devices. An example dual-mode module may support at least a radar mode and a data communications mode, and may have one or more antennas that include at least a first phased array antenna and a second phased array antenna, one or more processing shared between the radar mode and the data communications mode, and one or more power switching circuits for switching between the radar mode and the data communications mode. One of the first phased array antenna and the second phased array antenna is configurable for radar transmission and the other one of is configurable for radar reception. At least one of the first phased array antenna and the second phased array antenna is configurable for use in communications mode. The dual-mode module switches between operation as a radar module and operation as a communications module.

29 Claims, 22 Drawing Sheets

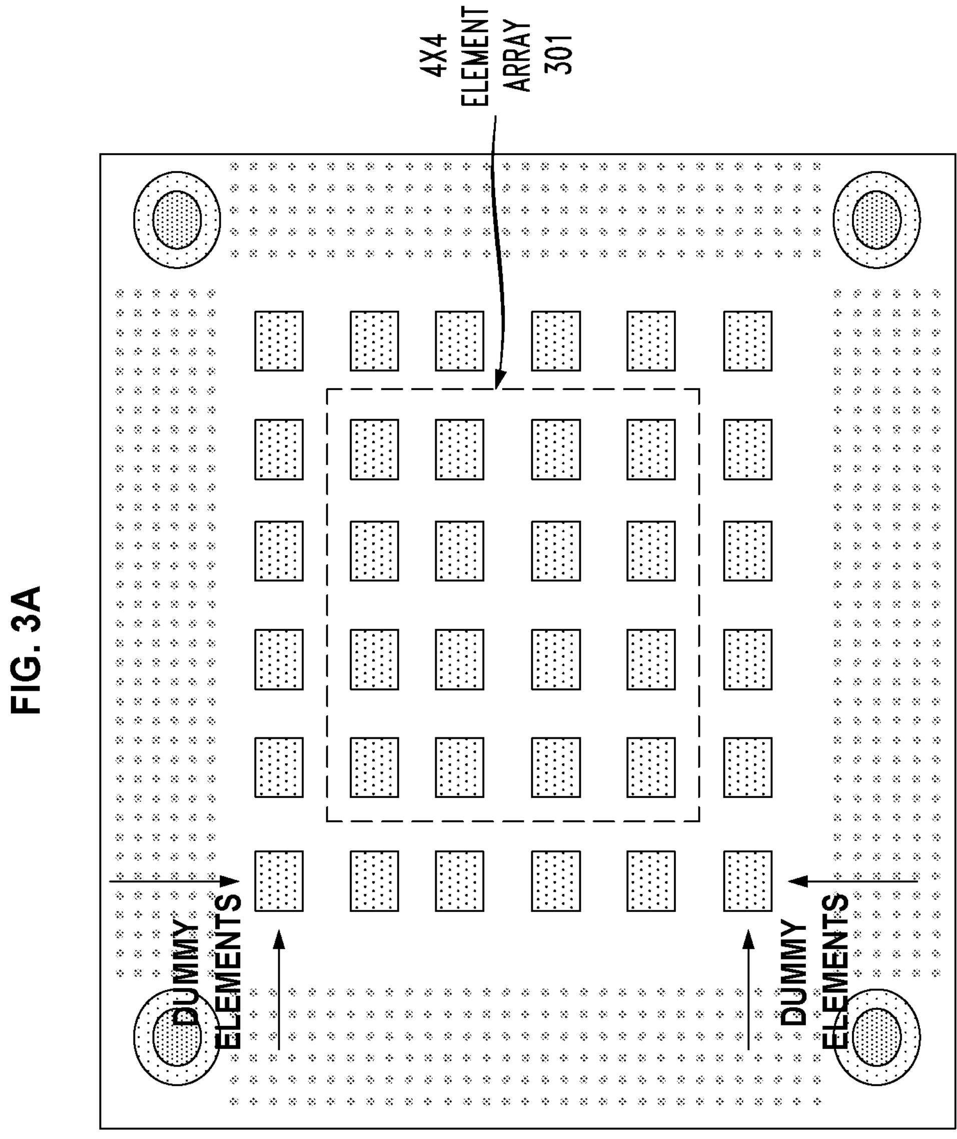
FIG. 3A

OPTION 1

OPTION 2

OPTION 3

N
813
1
811
N
SDR (inc. FPGA/µP)
Data
IF
Up/Down Converter
IF
LO
RF
Phased Array Controller
814
812
N
Splitter Or Switch
Ref
PLL
Ref
LO
815
816
817
817A

OPTION 4

1300

A
MODULE
1410
(90° DATA ONLY)
B
MODULE
1420
(360° DATA ONLY)
DRONE
1400
C
MODULE
1430
(90° RADAR OR DUAL
MODE (RADAR + DATA))
D
MODULE
1440
(360° RADAR OR DUAL
MODE (RADAR + DATA))

EXPANDED VIEW
TOP COVER 1510
RADOME 1520
ARRAY BOARD 1530
ABSORBER BAR 1580
CHASSIS 1540
BASEBAND BOARD 1550
FPGA SOM 1560
BACKCOVER/HEATSINK 1570
MODULE 1500
SIDE VIEW
END VIEW

METHODS AND SYSTEMS FOR IMPLEMENTING AND USING DUAL-MODE RADAR AND COMMUNICATIONS DEVICES

CLAIM OF PRIORITY

This patent application makes reference to, claims priority to, and claims benefit from U.S. Provisional Patent Application No. 63/452,979, filed on Mar. 17, 2023, and U.S. Provisional Patent Application No. 63/452,983, filed on Mar. 17, 2023. Each of the above identified applications is incorporated herein by reference in its entirety.

TECHNICAL FIELD

Aspects of the present disclosure relate to communication solutions. More specifically, various implementations of the present disclosure relate to methods and systems for implementing and using dual-mode radar and communications devices.

BACKGROUND

Operation of a radio frequency (RF) communication network in a dynamic, and sometimes hostile, RF environment poses many challenges, especially if the nodes in the network are highly mobile and the RF environment is rapidly changing. Each node is subject to interference, and the longer the distance to be covered, the more susceptible nodes are to interfering signals while power and antenna requirements increase.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for implementing and using dual-mode radar and communications devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF THE DRAWINGS

FIG. 3A illustrates an example planar phased array antenna.

DETAILED DESCRIPTION

Figure 1:
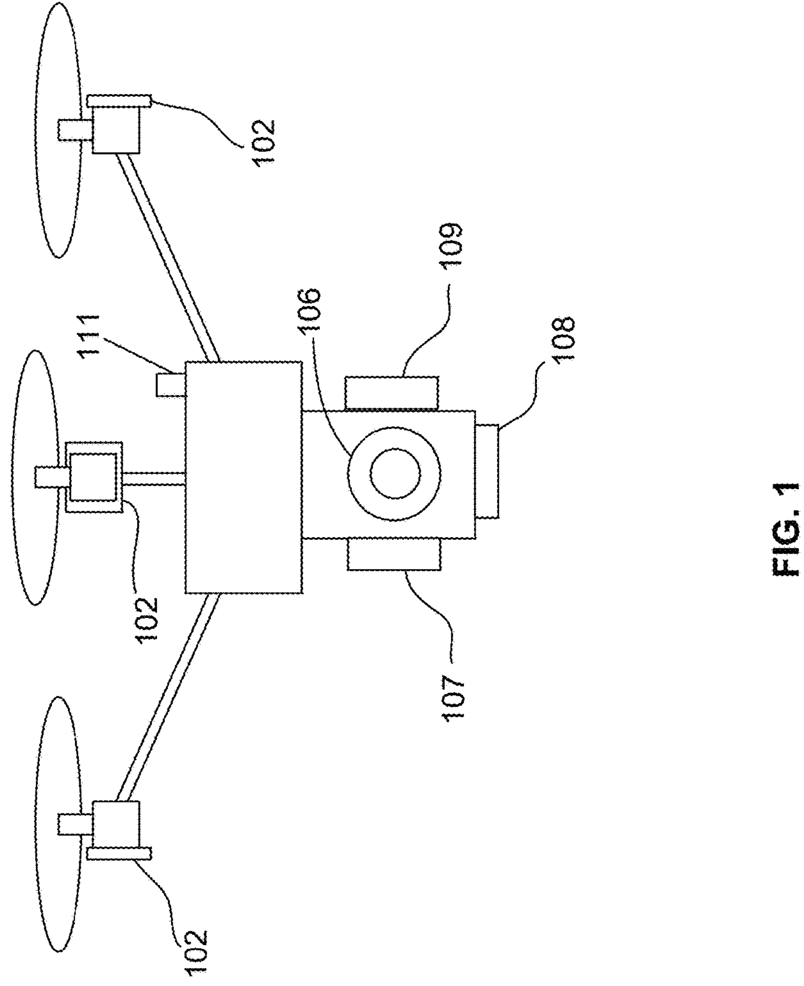
FIG. 1 illustrates an aerial drone that may be utilized in an accordance with an example embodiment of the disclosure.
Figure 1:
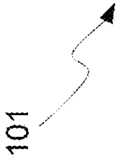

Communications networks involve tradeoffs in range, bandwidth, power, and noise immunity. A mesh network is a form of network where the distance covered can be extended by hopping communications through intermediate nodes. Instead of hopping along a single path, a mesh topology allows a communication link to be set up on any of multiple paths through the mesh. A mesh routing protocol allows a link to be set up between any two nodes over any available path through the mesh. If a link is broken because of interference or loss of a node, the protocol establishes a new route through the mesh. Accordingly, a mesh network is resilient and self-healing.

Existing mesh network implementations use nodes that are largely static or operate with omni-directional antennas, and operate at relatively lower frequencies. The present disclosure contemplates a mesh network of fixed or highly mobile nodes, with a preferred embodiment that operates as a swarm of aerial nodes, where the mesh may choose paths that reject interference based on directional properties of the node antennas and their transmission and reception. In addition, the network is implemented with millimeter (mm) wave (also referred to as mmWave) radios. Millimeter wave is high frequency, high-bandwidth, and thus offers higher data rates, than Wi-Fi bands. The mm wave spectrum is also less crowded with competing applications, especially above the highest frequency cellular bands. Another advantage of mm wave is that antenna size decreases with increasing frequency, allowing for more sophisticated, higher gain antennas in smaller, lighter weight packages. Phased array antennas allow for increased gain, and in particular, by adjusting the phase and amplitude of each element in the array, the antenna gain can be adjusted and steered so that the antenna is highly directional and rapidly adjustable, an important feature for the highly dynamic nature of the disclosed mesh network.

In a mesh network of nodes with omni-directional antennas, an interfering RF emitter will continue to interfere with nearby nodes no matter how the node is oriented relative to the interferer. Even if the node is mobile, changing the orientation of the node or minor adjustments in location are unlikely to alleviate the interference. However, by using a mesh network with directional antennas, such as phased array antennas, for example, nodes that are being interfered with may steer their antennas' beam patterns towards a node that is in a direction with less interference, use or select a different route through the mesh network that uses nodes whose antenna orientation is not aligned with the source of interference, and/or adjust the beam pattern so that a notch or null in the beam pattern is aimed at the interferer while only losing a slight amount of gain relative to peak gain. Nearby nodes that are within range of the interferer may also make these adjustments to their beam pattern as well. This may be done at high speed, with physically moving the node in space maintained as another option.

FIG. 1 illustrates an aerial drone that may be utilized in an accordance with an example embodiment of the disclosure. The drone 101 is not crewed, and is preferably lightweight with a useful payload on the order of 10 pounds. The drone is equipped with directional, planar phased array antennas 102. While FIG. 1 only has three motor/blade mechanisms visible, there is a fourth directly behind the front one, although a higher number may be utilized, such as six, eight, or twelve for example. The phased array antennas 102 can be mounted on any convenient surface on the drone to achieve the desired coverage based on the capability of the array, as further explained herein.

The drone is also equipped with sensors for collecting information. In the embodiment shown, the sensors include an optical imager 106, an infrared sensor 107, a LIDAR imager 108, an acoustic sensor 109, radar, and software-defined radio (SDR) for RF spectral sensing. The drone may comprise additional hardware for guidance, including a satellite position system antenna 111 and an inertial "dead reckoning" accelerometer and magnetic compass (not shown). The phased array antennas may be of any size, but are shown as 4×4 arrays in this embodiment, with an element size designed for the millimeter wave range, generally in the range of 10 to 200 GHZ. While any operating frequency could be chosen, the preferred embodiment operates at 24 GHz. In this mode of operation, line of sight communication of the radio links described herein is reasonable out to a single digit mile radius, with link distances typically under one mile.

Altitude is an important parameter for locating the drone in space, and essential for avoiding terrain. The drone preferably employs a combination of techniques for determining and maintaining altitude. Laser range finding, such as LIDAR, provides fast and accurate altitude information provided visibility is good. An on-board pressure altimeter provides a secondary reference, and the phased array antennas 102 may be used to provide ranging information to points on the ground using trigonometry if the ground surface is sufficiently reflective. Satellite provided GPS may also provide an estimate of altitude above the surface of the earth. Combining all these sources and comparing them to an on board reference map of the area of operation provides an accurate assessment of current altitude and contributes to a refined assessment of the drone's absolute position in space, further described below.

Figure 2:
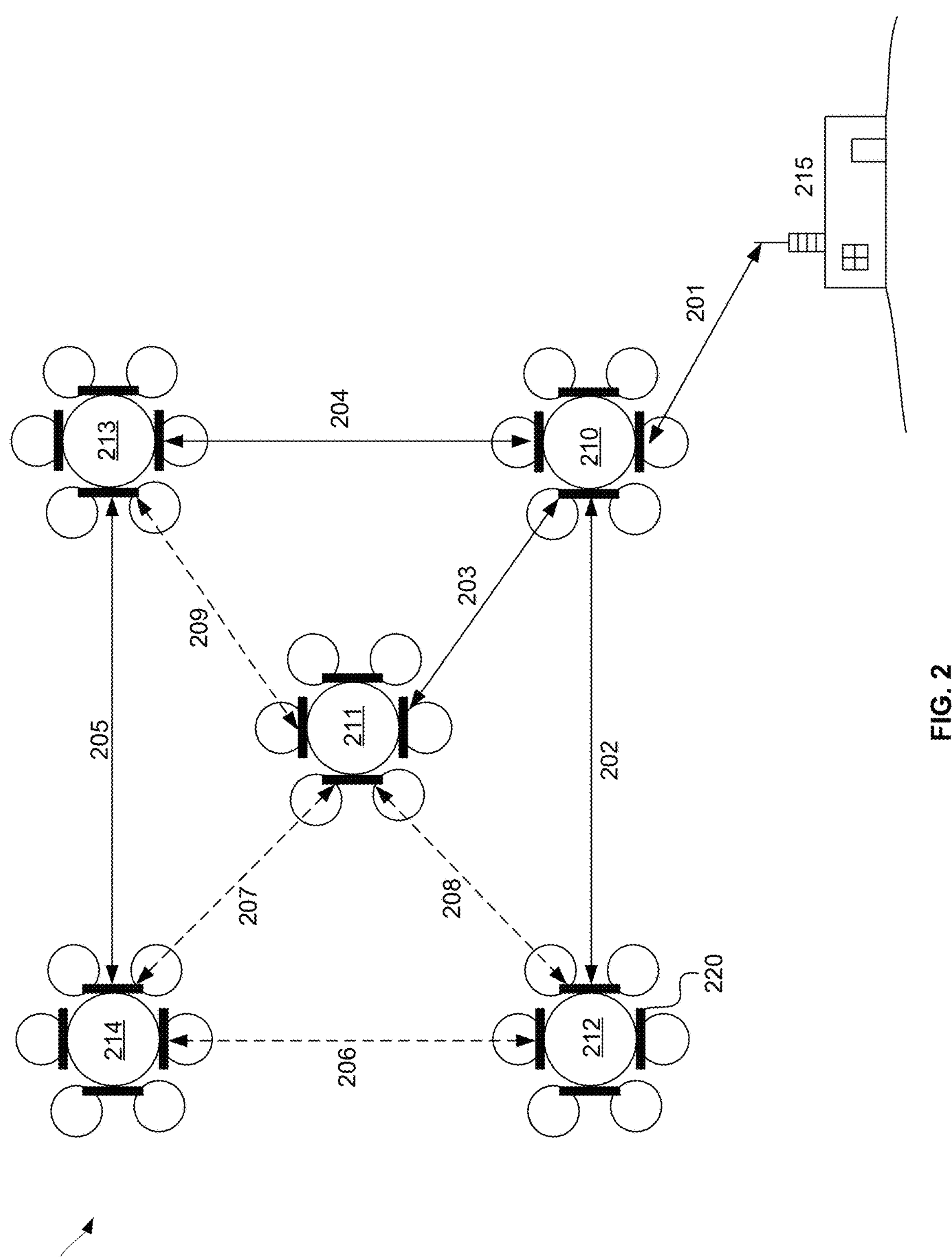
FIG. 2 illustrates an example mesh network formed by a plurality of aerial drones.

FIG. 2 illustrates an example mesh network formed by a plurality of aerial drones. Shown in FIG. 2 is a network 200 of aerial drones 210-214 forming a mesh network of links 201-209. Each of the drones 210-214 may comprise one or more phased array antennas 220, where the number of antenna arrays may ensure full 360 degree coverage. The network has a root at a ground or base station 215, which is shown as a static location but could also itself, be mobile. Dashed line links 206-209 represent alternate links between drones that are not active. Each drone acts as node in the network. It is not required that all nodes operate at the same frequency, and to avoid interference between nodes that are lined up such that a third further node is in the peak energy beam of a radio link between a first and second node, the network may employ several alternate neighboring frequencies.

FIG. 2 shows for illustrative purposes a drone swarm of unmanned aerial vehicles or drones. Each drone in the swarm is also a communications node and is equipped with one or more phased array, electrically steerable antennas and a transceiver operating in the millimeter wave region. Each drone may also be equipped with one or more sensors, such as optical, LIDAR, thermal, or acoustic sensors. The drones carry an on-board processor and memory for controlling the drone's movements, operating the sensors, and managing the transceiver. The drones also carry antennas and a processor for determining position based on satellite data ("GPS") and optionally an on-board inertial and magnetic (compass) sensor. The drones communicate with each other to form a mesh network of communication nodes with an RF link back to a root node, base station, or other target node in the network. The nodes respond to interference from jammers and obstacles by finding new paths through the mesh, steering the millimeter wave beam, re-positioning, or a combination of these techniques.

Path loss of a radio link increases proportional to the square of frequency. For example, going from 2.4 GHz which is roughly a common frequency for cell phones and 2.4 GHz Wi-Fi to 24 GHz would result in a path loss that is 100 times higher, or 20 dB. Going from 2.4 GHz to 80 GHz would have a 30 dB increase in path loss. In a free space propagation condition, the path loss increases by 20 dB for every decade of distance. Therefore, going from 2.4 GHz to 24 GHz would reduce the link distance by a factor of 10, and the link distance for an 80 GHz link would decrease by a factor of 33. However, high frequencies have the benefit of very wide bandwidths and thus faster data rates. Additionally, the size of the antenna decreases with frequency (wavelength), enabling the use of more complex, higher gain antennae to combat the increase in path loss. Higher gain results from focusing the energy, thereby resulting in highly directional antennas.

The phased array antenna consists of numerous antenna that have their amplitude and phase adjusted to steer the beam by adjusting summation and cancellation of signals from various directions. The focusing of the energy, often in both azimuth and elevation, creates a higher gain antenna. However, the very focused beam is preferably pointed in the right direction to facilitate communication. Additionally, the focusing of the beam means the transmission/reception in directions away from the main beam is attenuated, which may enable the avoidance of interference.

Furthermore, the phased antenna arrays may help with isolation of communication channels such as transmitting in one direction and receiving in another. Phased array antennae utilize software to control the gain/phase of each antenna element for steering of the beam, where the system is aware of which direction to steer the beam. The beams may be steered by knowledge of relative GPS locations or drone formation which may be known based on a flight plan or shared over a communications link. The beams may also be steered by scanning the beam and/or with closed-loop tracking. One typical implementation of a phased array antenna uses a planar array of patch antenna elements, as shown with respect to FIG. 3A. This has the advantage of being flat and thus can fit well onto an aircraft without significant size and aerodynamic implications.

FIG. 3A illustrates an example planar phased array antenna. Shown in FIG. 3A is planar phased array antenna 300. The antenna 300 comprises 16 elements in a 4×4 element array 301, with an outer ring of "dummy" elements. The total area of the array can be relatively small, less than one square inch. Different arrays with varying numbers of elements will yield different patterns, with additional elements allowing for sharper peaks. While the array 301 in FIG. 3A has rectangular shaped elements, other shapes are possible, such as circles, squares, ellipses, and triangles, for example. Additionally, an array may be constructed using various antenna element types such as a Vivaldi antenna.

Figure 3B:
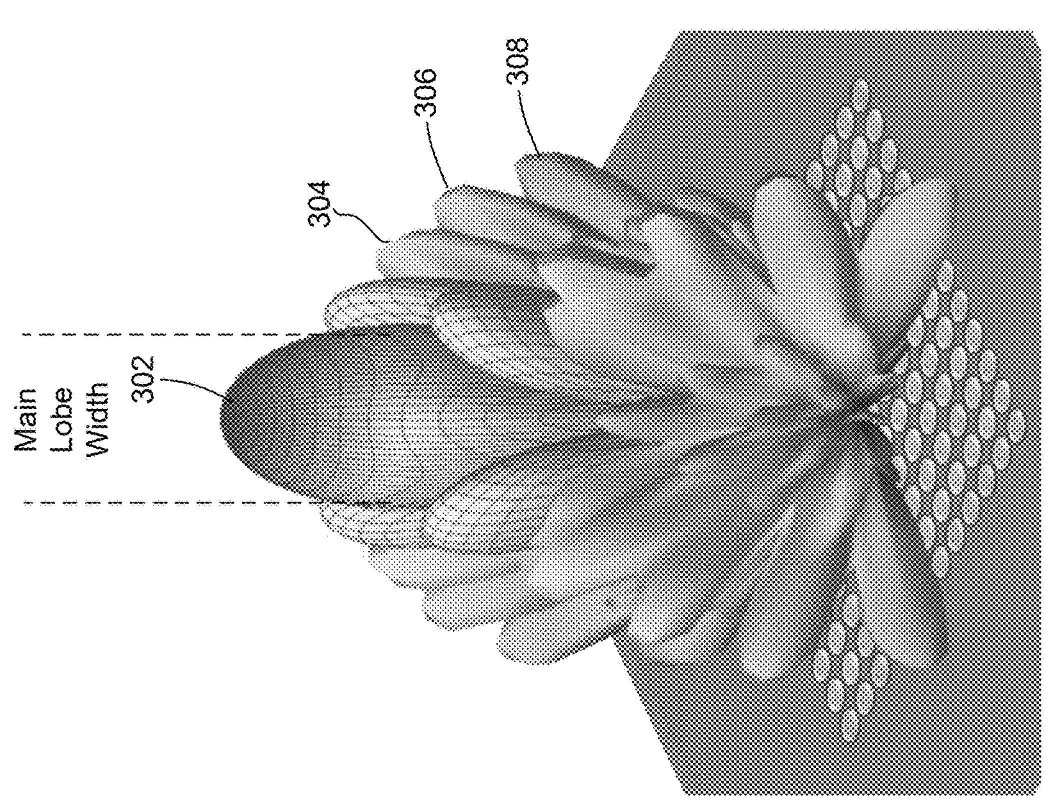
FIG. 3B illustrates a radiation pattern generated by an example planar phased array antenna.

FIG. 3B illustrates a radiation pattern generated by an example planar phased array antenna. Shown in FIG. 3B is a three dimensional view of the radiation pattern of the array 301 of FIG. 3A, also referred to as a phased array. The pattern shown in FIG. 3B has a main lobe 302 with sets of sidelobes 304, 306, and 308, with other smaller lobes and areas of near-zero gain between the main lobe and the sidelobes. The useful region of the pattern is indicated by the Main Lobe Width shown by the dotted lines, representing a roughly one decade roll off from the peak of the main lobe 302. The entire pattern can be moved horizontally or vertically by electrically "steering" the phased array 301, with a useful range of +/−45 degrees or more in any direction. The steering may be accomplished by adjusting the phase or phase and amplitude of the signal going to each element in the array 301.

The combination of multiple steerable antennas with multiple nodes in the network allows for rapid self-healing in the presence of interference or other degradation that causes a node to node link to become unavailable. The antenna 300 can be rapidly steered to point to a different node in the mesh, and likewise antennas that are receiving interference can be rapidly steered away so they are no longer pointed at an interfering transmitter. In a similar fashion, communications can be routed to different nodes by activating a different antenna on a different face of a node and turning off the antenna that is being interfered with entirely.

The 4×4 array shown is approximately 0.75 square inches and may be electrically "steered" up to 45 degrees from normal to its surface without significantly impairing the beam pattern's gain at its center point in main lobe 302. Also of significance is the ability to steer not just the "peak" gain of the beam, but the ability to steer "null" points in the beam pattern. This allows the antenna to be both steered to point at a transmitter or emitter of interest while steering the null in the pattern towards an emitter that is interfering.

By providing four antennas on each of four faces of a drone 210-214, the ability to steer+/−45 degrees from normal allows each node to aim at least one antenna in any direction in the horizontal plane and through 90 degrees of the vertical plane. Coverage for the cones above and below the drones 210-214 could be provided with a fifth and sixth array mounted on the top and bottom of the drones 210-214.

A node may want to know if it is subject to interference. The planar, directional phased array antennas provide a beneficial way to scan for interfering signals. When a link such as 204 is not active, the drone 210 can observe the RSSI level which can be considered a background RSSI, and scan the antenna through all or portions of its available steering range. The minimum RSSI level detected may represent a non-interference or low interference case, while other particular scan directions would result in an increased background RSSI level. The node could identify the direction and also the amount of the background noise increase. This is enabled by the directionality and scanning properties of the antenna. A similar background RSSI level measurement using an omnidirectional antenna cannot determine if a given background reading is due to interference, gain variations in the receiver, or variations in the detector.

Figure 4A:
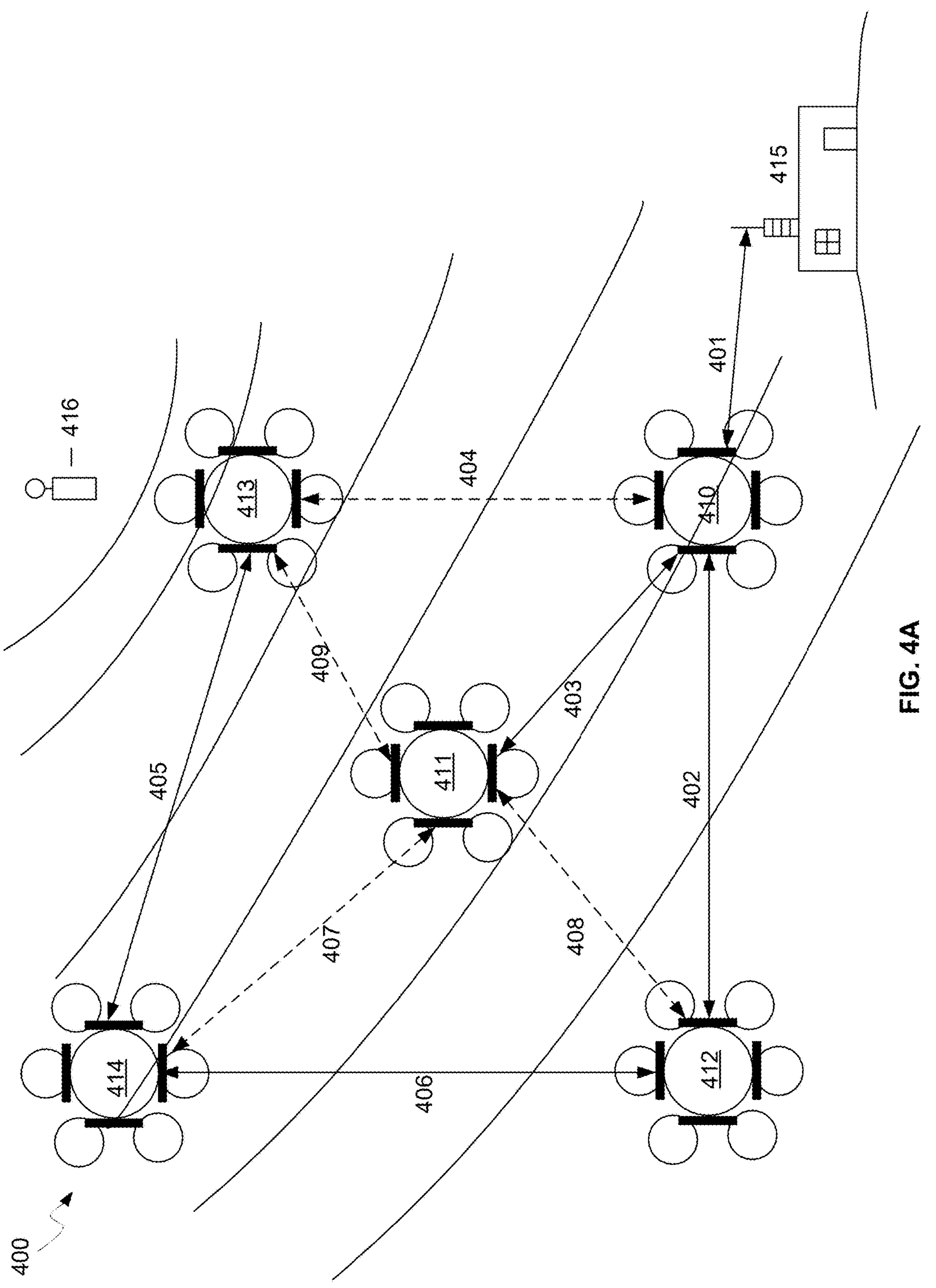
FIGS. 4A to 4B illustrate an example drone network in the presence of an interfering signal.
Figure 4B:
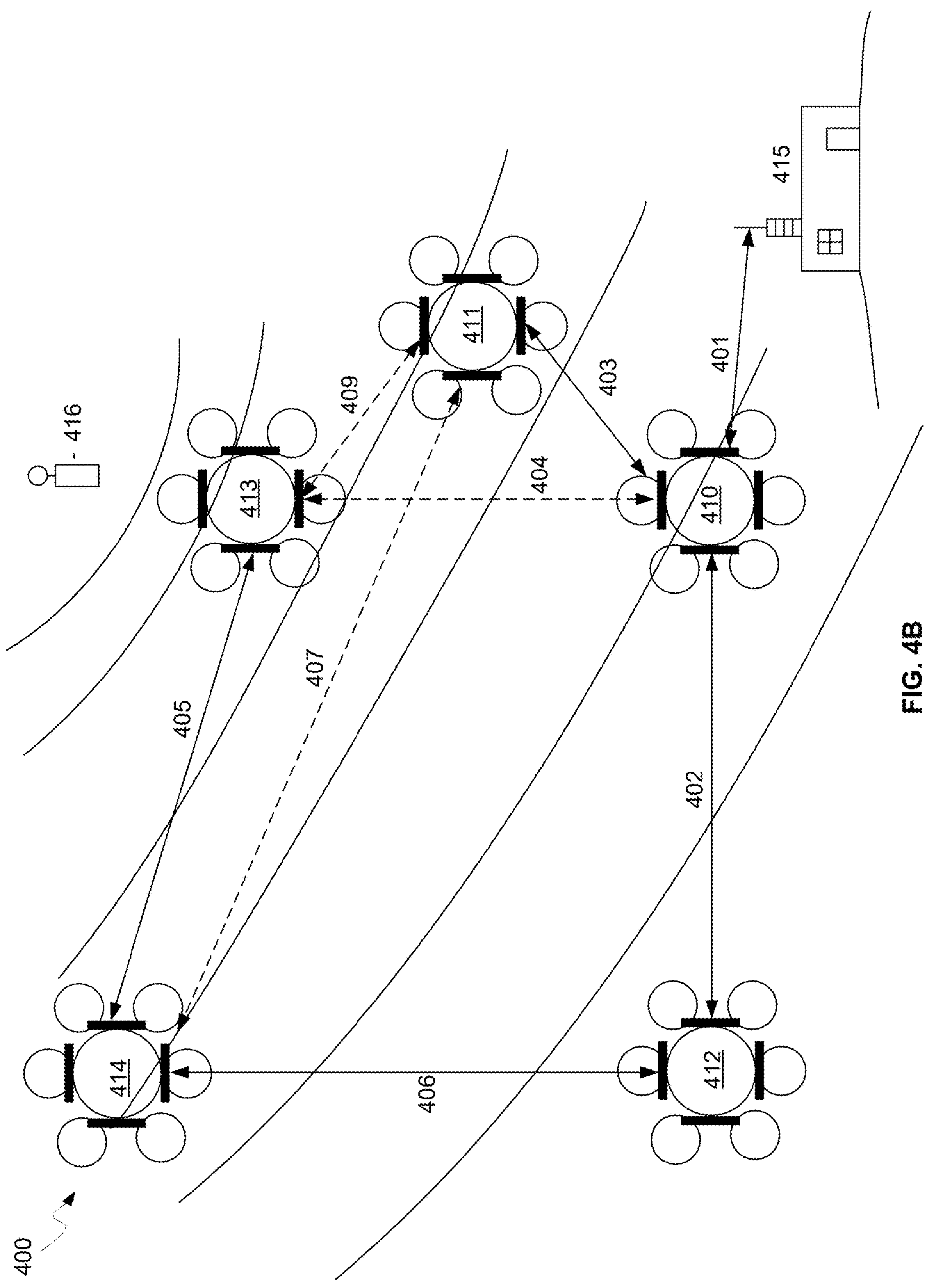

FIGS. 4A to 4B illustrate an example drone network in the presence of an interfering signal. Shown in FIGS. 4A-4B is mesh (drone) network 400, comprising a plurality of drones 410-414, each also referred to as a node, in the presence of an interferer 416 which generates the interfering signal. All of the paths between the nodes that could have been utilized before the interferer 416 was present are shown in dashed or solid line. The interfering signal could be an unintentional interferer, such as a system operating on an adjacent or the same frequency, or an intentional "jamming" interferer, designed to disrupt the network. Alternatively, a link could be disrupted by the interposition of an obstacle, such as a building or terrain. In FIG. 4A, the interferer 416 is broadcasting omni-directionally. Because of antenna orientation in this configuration, the interfering signal may disrupt links 404, 408, and 409, as each of these links has at least one antenna generally pointing towards the interferer 416 when the antenna is pointed or steered toward a neighboring node. Link 407 is dashed in this example as it is not needed to provide a link to node 414, since it has links 405 and 406.

Even with links 404, 408, and 409 possibly compromised due to the interferer 416, node 413 would still be connected to the mesh network 400 in this scenario due to the directional antenna capability of the nodes and the ability of the mesh network to route around unavailable links. In this example, the antenna on node 414 may need to be steered slightly away from node 413 to minimize the interference impact and steer the beam pattern of the antenna directly at the corresponding antenna of node 413 on link 405.

The controller in each drone may assess the relative signal quality of a link based on link metrics such as error rate or relative strength of the background interference signal. The received signal at a directional antenna on a drone during operation of a link will have a measured RSSI (Received Signal Strength Indication). When the link is not operating, the background environment will cause a second, typically significantly lower, RSSI. In the presence of a jammer or other interfering signal, however, the RSSI during periods when the link is not operating will rise. The controller may apply a cutoff metric to switch the node to an alternate path when the ratio of RSSI during operation of the link to the background RSSI falls to an unacceptable level.

If in the presence of interference, drone 413 determines that its links 404 and 409 may no longer be available, and the mesh protocol reports the unavailability of link 408. Drone 413 needs a new path through the drone network to base station 415, which corresponds to a root node or a fixed node, although it is not a requirement that paths be traced to a base station. Communication links may be established using the mesh topology between any two nodes, and the use of a link to a base station is illustrative. The controller for drone 413 operates with the network to find a new path back to the root node, corresponding to base station 415, using a self-healing mesh protocol. In addition, any of the drones may move in space and/or change the directionality of its antennas to reconfigure the mesh network 400. In the illustrative case of FIG. 4A, drone 413 is routed through link 405, 406, and 402 to drone or node 410, and thence over link 401 to base station 415.

Note that if the nodes use non-directional antennas, more links will be compromised in the presence of interference. The level of interference rejection with directional antennas is limited by the ratio of the main lobe to the sidelobes. That parameter can be altered by adjusting the size and shape of the array and the number of elements in the array to optimize the main lobe to sidelobe ratio.

Any of the drones 411-414 may improve the link in the presence of interference by one or more of: steering the phased array antenna in the active link to orient a null towards the jammer, physically orienting the planar array surface in a more favorable direction relative to the jammer, or moving the drone in space relative to the jammer. In some instances, moving one or more of the drones may also help eliminate the interference.

In another example, the drone 411 may change its location, for example moving towards the right of the diagram or east, as shown in FIG. 4B as compared to FIG. 4A, such that its directional antennas may be reoriented to transmit and receive in a direction away from the interferer 416, so that the interfering signal would not be received. In this manner, each of the nodes is still connected to the network and to the fixed node corresponding to base station 415, with only link 404 having an interfered path. Links 407 and 409 may be utilized, but are not needed in this example as each node is connected via other links. Drone 411 is now able to connect directly to node 410 due to shortening the range and beam steering the respective antennas on drones 410 and 411 so they are off axis with the interferer 416.

There are many options for the mesh network 400 to overcome interference due to the directionality of the antennas and the mobility of the drones. Each of the drones can move in a lateral direction and/or move to a different elevation to avoid the interfering signal or place the interfering signal in a beam null while directing the beam maximum gain at the desired target. Similarly, each drone may physically rotate to provide even further flexibility in the transmission/reception direction.

Figure 5A:
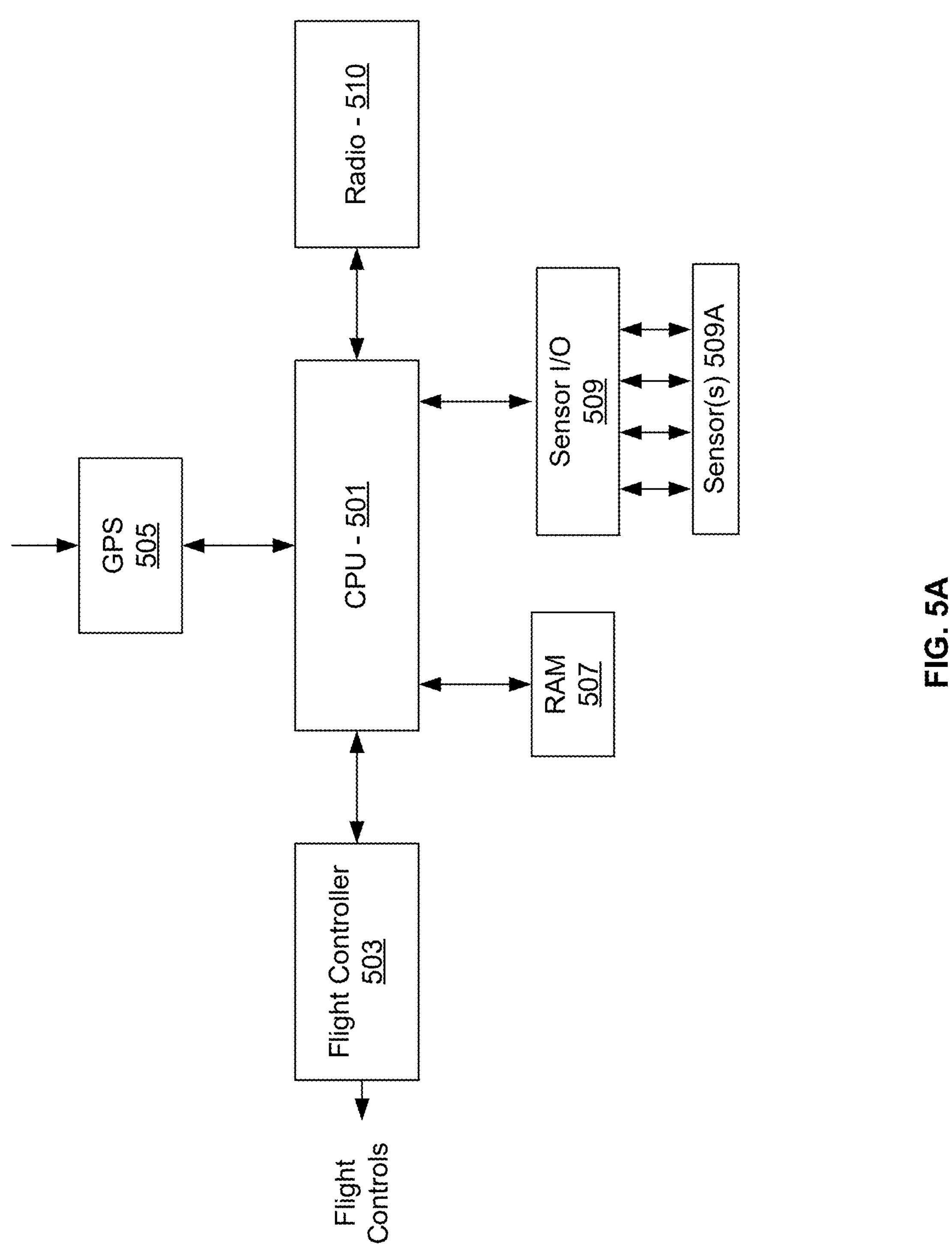
FIG. 5A illustrates an example electronics package for a drone.

FIG. 5A illustrates an example electronics package for a drone. Shown in FIG. 5A is a drone 101, and particularly a block diagram of the electronics package for the drone 101. Power for the electronics and flight controls may be supplied by a rechargeable battery, while the drone's primary lift (propellers/rotors) can be driven either electrically or by combustion. The CPU 501 is preferably a microprocessor with instructions carried in on-board Read Only Memory, with an external RAM and/or non-volatile memory 507 for storing sensor data and mission specific data. The CPU 501 can communicate with one or more sensors 509A via sensor interface 509.

The electronics may also comprise flight controller 503 for controlling the primary lift as well as any other flight-specific hardware. The GPS block 505 may comprise circuitry for receiving signals from GPS satellites for triangulating the position of the drone. The radio 510 may comprise the phased array antennas and associated circuitry, as illustrated in FIG. 5B.

Figure 5B:
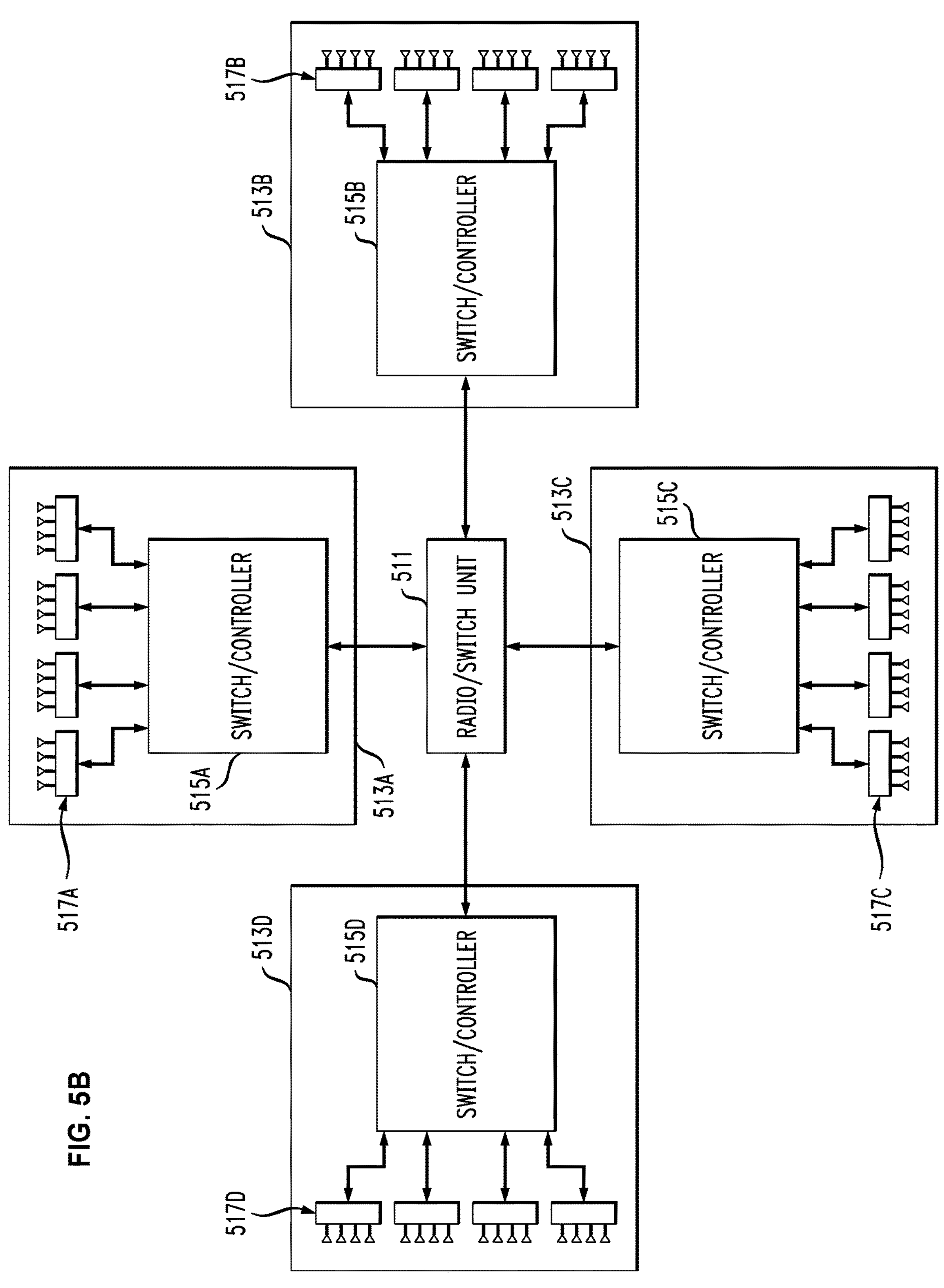
FIG. 5B illustrates an example implementation of a radio architecture.

FIG. 5B illustrates an example implementation of a radio architecture. Shown in FIG. 5B is a block diagram of one example implementation of a radio architecture, having four independently controlled phased array antenna units 513A-513D and associated radio and switch unit 511. In one example embodiment, the radio/switch unit 511 comprises a software defined radio (SDR), although other types of radios are possible. Each antenna unit 513A-513D may comprise a switch/controller 515A-515D for enabling the configuration of beam patterns of the four antenna element columns 517A-517D and for switching on and off the elements, depending on desired direction of transmission and reception, and power savings. It should be noted that any number of arrays may be utilized based on their electronic scanning range and/or presence of mechanical scanning.

The radio/switch unit 511 can be configured so that it controls only one array at a time in order to save cost. Alternatively, the radio/switch unit 511 can be configured as four radios allowing for continuous, 360 degree coverage in the x/y plane in real time. Other combinations or ratios of radios to antennas are possible. For example, six SDR radios combined with planar antennas of multiple arrays 301 mounted on a top and bottom surface of a drone 101 would provide spherical coverage in real time, provided that the antennas have useable steering of +/−45 degrees from normal. An array can be designed for +/−60 degree steering such that 360 degree coverage can be provided with three arrays 301 having a steering angle of +/−60 degrees and the drone 101 can then be provided with three sides having a normal direction offset from each other of 120 degrees as opposed to the square configuration with the faces of arrays 301 offset at 90 degrees from each other shown.

It should be noted that the beam pattern for each antenna can be controlled in two dimensions, x and y, so for a given orientation of the drone, the beam pattern can be angled down or up as well as side to side. This allows the controller to enable a drone to avoid interference not just by moving horizontally, but vertically as well, for example to gain elevation over terrain or buildings, or to further orient an interfering source into a null area of the antenna beam pattern. The ability to point the antenna beam towards the ground is also useful for the purpose of locating the interfering source, as further described herein.

The configuration of the mesh network may be done autonomously by selecting links that survive the impact of the interferer. Further amounts of intelligence can be added to the system. Various options comprise: first, one drone that knows its location (ex. GPS), orientation of the drone, and relative angle where the interferer is found. This would determine a vector along which the interferer would lie, and would be an absolute vector referenced to earth coordinates. Second, the two or more drones, that know drone locations (ex. GPS), know orientation, and know angle of arrival from the interferer can pinpoint an absolute spot since the drone locations are known, using geometry and the reference map. Third, where two or more drones know location and time of arrival of the interferer the network can again pinpoint an absolute spot since the drone locations are known. Two drones would define arcs of possible locations, with three or more drones capable of resolving a location based on the intersection of possible arcs. The time of arrival may be determined by looking for a signature in the interferer and determining when that signature arrives at the different drones. The signature may be a pulse, a modulation signature, or any other temporal event. The timing would be relative to a common timing reference such as a GPS-derived timing reference.

The fourth example comprises the situation where two or more drones that know a relative relationship by knowing link angles between the drones, the angles to the interferer, and the distance between the two nodes based on timing differences. This would be an interference location that is relative to the drone frame of reference, not an absolute geographic reference. Finally, one or more drones that identify angle of arrival of the interferer (from known locations and orientations), may create its own baseline by moving and then checking the new angle towards the interferer to triangulate the location.

Additional methods, including combining triangulation and time of arrival information, can be used to determine the interferer's location. The advantage of determining the interferer's location is that the mesh links may be optimized to avoid the interferer. This optimization can include steps such as choosing links and routes that do not have antennas aligned with the interferer, adjusting antenna patterns to minimize the effects of the interferer, and possibly relocating drones to improve the links (i.e. link directions not aligned with the interferer). Furthermore, other mesh network optimizations are possible such as optimizing mesh routing to reach all nodes with the minimum number of hops or best overall throughput.

The antenna pattern adjustments may include techniques such as adjusting gain and phases of antenna elements to improve sidelobe suppression or place nulls in the direction of the interferer or possibly steering the main lobe slightly away from the desired direction if this action helps to place a null or reduced sidelobe in the direction of the interferer. In this case, the signal may decrease by a small amount but the link would be improved because the interferer would decrease by a larger amount. Any of these techniques may be used by a drone or node in an open loop fashion, meaning that the node would not know the location of the interferer and would try different settings until the link is improved. However, by knowing that an interferer is present, the node may try different steps. For example, the node may focus on steering the main beam to maximize signal, but if the node knows an interferer is present it may try techniques to alter the antenna for interference rejection. The mesh can also respond by adjusting link usage to avoid the interferer. In the case where the interferer's location is known, more careful and calculated responses can be taken. For example, the nodes may know precisely how to adjust antennas and overall the mesh would make use of links that are not compromised or subject to the interference. Furthermore, node locations could be moved to minimize the interference effects.

In one mode of operation, the drone swarm may operate to locate interfering sources. A known technique for finding the location of an observed object is baseline triangulation. By establishing a baseline between two points, and then measuring the angle towards an unknown target relative to the baseline from two points along the baseline, the location of the unknown point may be determined by trigonometry. A characteristic of the present network is that the nodes operate on a common clock, deriving timing from a GPS accurate source. With a common clock and at millimeter wave frequencies, the baseline distance between any two nodes that are in communication may be readily determined by measuring the time of arrival of the signal between the two nodes. Those two nodes can then scan for interfering signals by steering the antenna over a region of interest and determining the vector or offsetting angle that corresponds to a peak in the received energy from the interfering signal. The neighboring drone may also perform the same scan, and communicate the resultant vectors to neighboring drones as well. This information may be combined in the controller and the relative position of the interfering transmitter is mapped accurately in three dimensional space by computing a triangulated trigonometric solution and combining it with the known absolute reference location and orientation of the drone based on GPS data, inertial guidance, and magnetic orientation.

In another scenario, because an omnidirectional interferer will have different times of arrival at each drone, the time of arrival of a signature signal will define a curved surface on which the interfering transmitter lies. Combining time of arrival information from three or more drones is sufficient to isolate the interfering transmitter's location and relative strength as long as at least one drone in the formation has accurate absolute position information. Absolute position information can be continuously updated based on GPS positioning of each drone, or based on relative offset from a fixed base station location that is known with precision, since at millimeter wave frequencies that angle and distance between each drone can be determined with a reasonable degree of precision as long as the drone has a working link through the network.

In another variation, a single node may provide the multiple directional data points to locate an emitter by moving in space or translating from one position to another. For example, based on a first determined angular direction of a signal's arrival, the node can translate itself in a direction roughly orthogonal to the angle of arrival of the signal of interest until the angle changes sufficiently to perform a triangulation calculation. In this way, a single node can maneuver to develop its own baseline for triangulation. Because the drones can gain altitude as well as move in the x/y plane, such a baseline can be formed as a vertical baseline as well. A sufficiently accurate stored map of the surface in the area of operation combined with an altitude determination of the drone above ground level could also be sufficient to triangulate an interferer location if the emitter is assumed to be on the surface. Altitude could be determined by on board GPS, pressure altimeter, or laser range finding such as LIDAR imager 108. Alternatively, the node can translate and measure angle of arrival combined with time of arrival to perform a calculation based on spherical distance.

FIGS. 6 to 11 illustrate array configurations and block diagrams showing operations of shared resources, such as in a mesh network environment.

Figure 6:
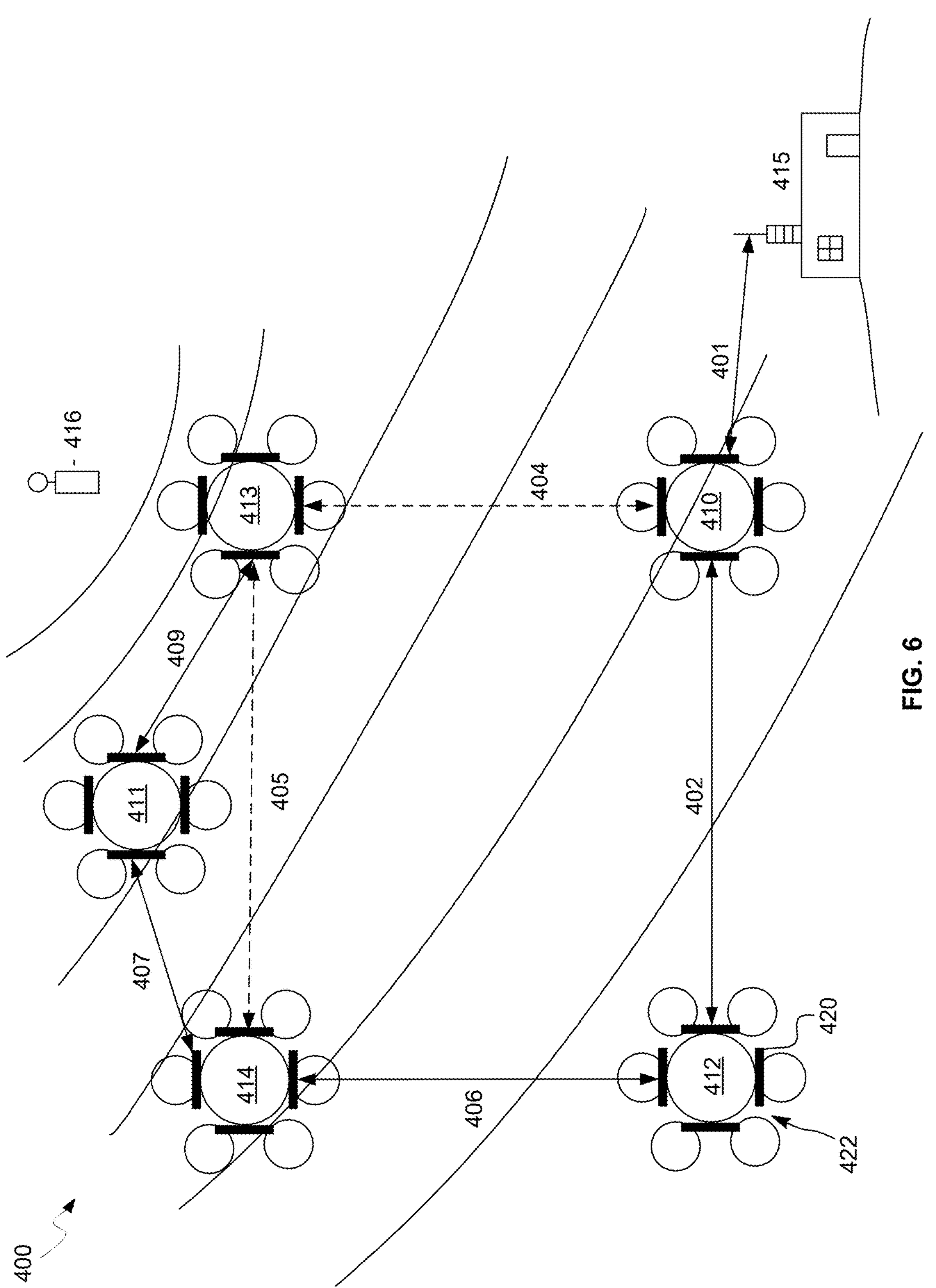
FIG. 6 illustrates an example drone network.

FIG. 6 illustrates an example drone network. Shown in FIG. 6 is the mesh (drone) network 400, and particularly use case scenario associated therewith. As shown in example FIG. 6, each array face 420 (e.g., an array or combination of arrays focused in a substantially common direction and/or physically arranged on a common surface) is configured to scan about +/−45 degrees or 90 degrees in total, such that four arrays result in full, 360 coverage. In some instances, a given device, assembly, and/or drone 410-414 may have one, two, three, four or more unique array faces 420 on one or more surfaces or sides 422 of the drone. Although In some instances, a four or six sided drone or four or six arrays or array faces are discussed, any number of arrays, array faces, and/or surfaces are considered in the present disclosure.

There are multiple systems and applications capable of providing 360 degree coverage employing the disclosed array faces 420. In an example, a drone could use 3 array faces if the arrays can be scanned +/−60 degrees, or any number of array faces operating in a variety of scanning configurations to achieve a desired coverage (e.g., 360 degrees). In some instances, complete 360 degree coverage is not required, such that one or more arrays or array faces 420 would scan a reduced coverage range over a given time, for a given application, and/or in a given location. The advantage of fewer arrays and/or fewer scans is lower cost, size, and/or weight. In some such examples, a larger array or array face may be employed to scan one or more ranges, which may result in limited visibility at edges of a scanned zone. Conversely, employing a greater number of arrays and/or larger array faces may reduce scanning requirements for each, which may result in extended visibility in a scanned zone. In some instances, more and/or larger arrays/array faces allows more options for simultaneous operation of the arrays/array faces.

Figure 7:
FIG. 7 illustrates an example drone of a drone network.
Figure 7:
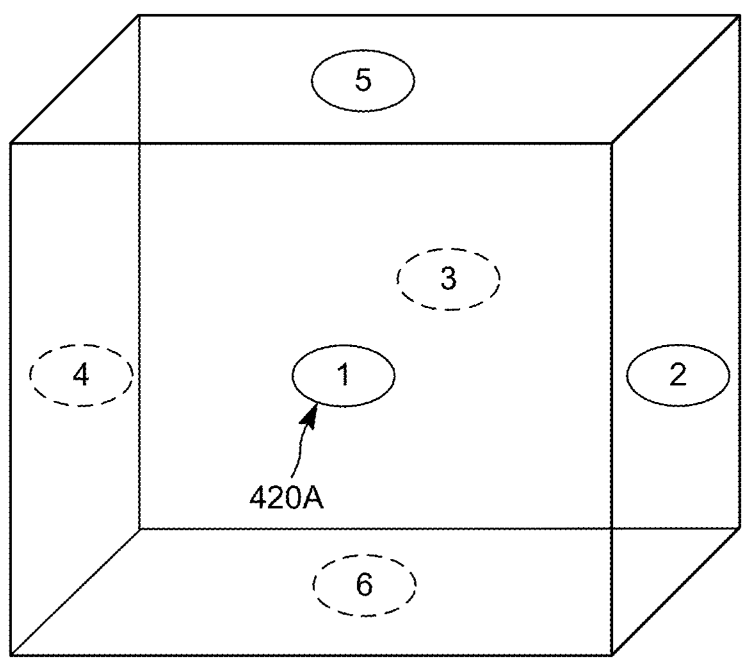
Figure 8A:
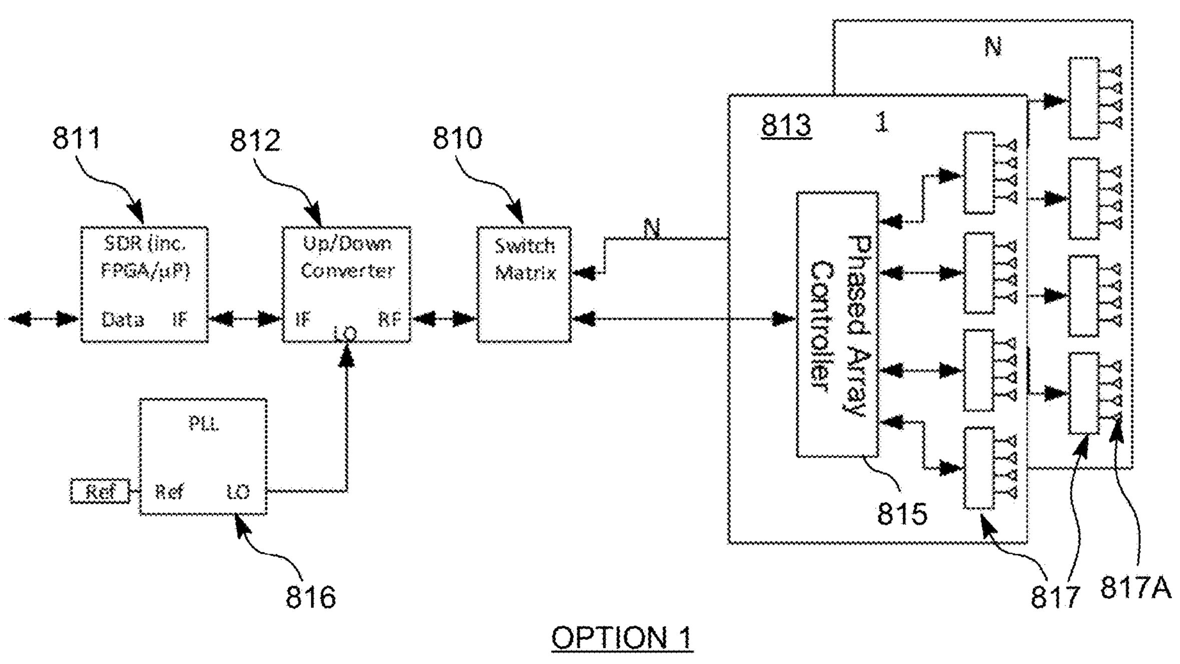
FIGS. 8A-8D illustrate different shared architectural options.
Figure 8B:
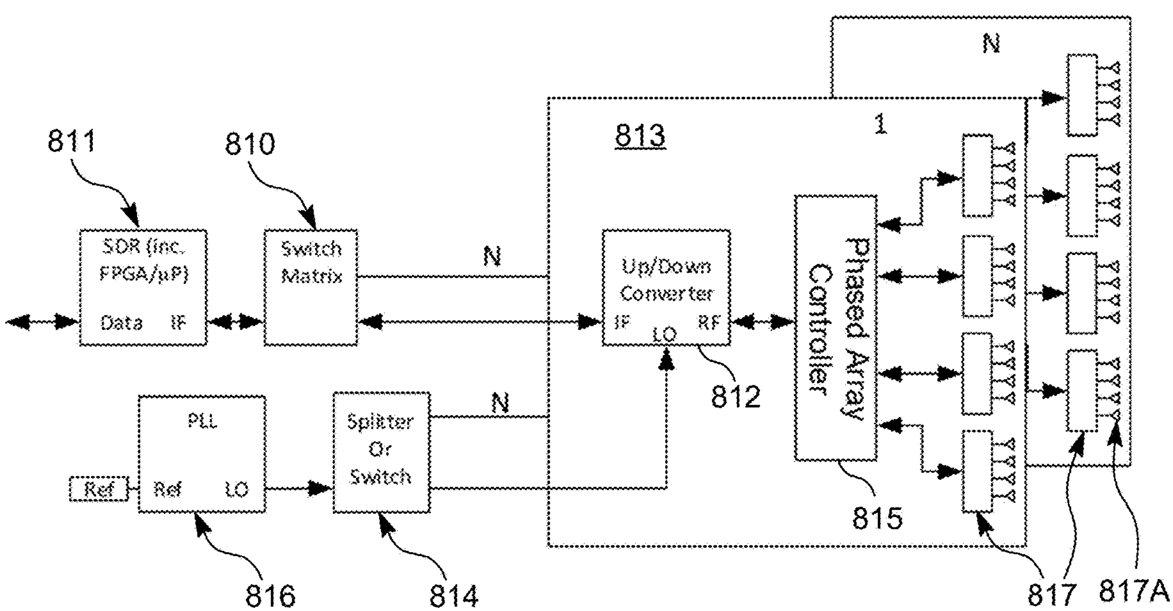
Figures 8C, 8D:
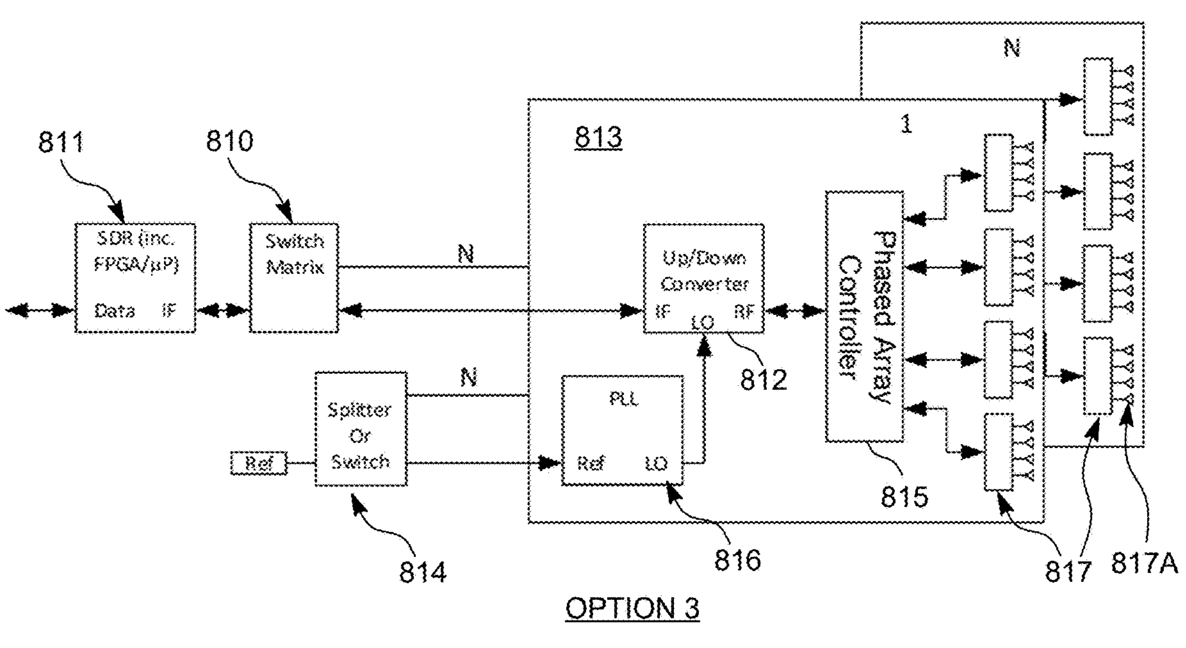

FIG. 7 illustrates an example drone of a drone network. Shown in FIG. 7 is a drone of the mesh (drone) network 400, and more particularly a use case scenario associated therewith, specifically as an extension of the configuration described with respect to FIG. 6. As shown in a simplified block format, an example drone 410A of FIG. 7 not only provides 360 degree coverage with array faces 420A numbered 1-4, but also provides full spherical coverage by adding array faces 5 and 6. In examples, smaller or larger numbers of array faces can be used to cover a desired region of operation. For example, in a drone use case, it may be desirable to have an array on the top (e.g., scanning the region or sky above) to be able to detect other local aircraft. There are a number of scenarios, such as sense-and-avoid or detect-and-avoid scenarios, where the drone(s) would be able to detect other local aircraft (e.g., via radar) and identify trajectories and take evasive action.

In an example where a drone is equipped with an array arranged on the bottom (e.g., bottom surface with array 6 of drone 410A) a downward-facing radar can be used as an altimeter. There are additional or alternative multiple or different communication scenarios that may make use of the top and/or bottom arrays. For example, the downward-facing array may communicate with ground terminals and/or lower arranged drones. The system is also not limited to drone applications. In examples, the drone may be used as a ground-based dual-mode communications and radar system. In such an application, four array faces (e.g., arranged on four sides), combined with the top face would provide additional monitoring capabilities. The disclosed and other cases may include one or more array faces 420A at right angles to one another, but the faces can be angled, tilted and/or oriented in one or more directions advantageous to the application. In some instances, the surfaces themselves (e.g., surfaces 422) and/or the array/array faces (e.g., array faces 420/420A) are flat, but may have a rounded or otherwise complex geometer, designed to orient or otherwise focus an array or array face in a desired direction(s).

FIGS. 8A-8D illustrate different shared architectural options. As shown in FIG. 8A to 8D, one or more shared architectural options are disclosed. The options are designed to support a desired number of array faces to result in balance of resources, such as cost, size, power, weight, and performance. The options 1-4 (corresponding to FIGS. 8A to 8D, respectively) are listed and summarized on Table 1, below. In the description, relative terms are used to describe characteristics of a given option with reference to characteristics of another option.

| Option | Array faces | Up/down converter | PLL | SDR (incl. FPGA/uP) | Advantages | Tradeoffs |
|---|---|---|---|---|---|---|
| 1 | N | 1 shared | 1 shared | 1 shared | Low cost, small size and/or weight, low power requirements | Activate one face at a time (or same signal/frequency used on all faces). Employs routing of mm Wave signals from central location to faces, which may result in signal loss or require more expensive physical connection. |
| 2 | N | 1 per face | 1 shared | 1 shared | Route IF signal instead of RF signal to faces: more tolerant of loss due to location in lineup, lower frequency helps with loss, and may be able to use lower cost routing solution. | Doesn't result in significant change to functionality. Requires LO to be routed to all faces. Added cost of additional up/down converters. |
| 3 | N | 1 per face | 1 per face | 1 shared | Simple interface routing (IF and reference but no high frequency signals). Different faces could operate at different frequencies. | Added cost of additional PLLs. Highest cost, as it results in a minimal number of shared components. |

-continued

| Option | Array faces | Up/down converter | PLL | SDR (incl. FPGA/uP) | Advantages | Tradeoffs |
|---|---|---|---|---|---|---|
| 4 | N | 1 per face | 1 per face | 1 per face | Allows each face to operate independently. Can use each face for radar or mesh simultaneously. Creates the most self-contained module for a face. | |

A given drone may employ one or more of the disclosed options in a variety of combinations. For example, a drone may include an option-4 type array on a top-mounted array face (e.g., surface 5 of FIG. 7), with an option-1 type array for one or more of the four side-mounted faces (e.g., surfaces 1-4 of FIG. 7). Such an arrangement is employed if the top array is activated or used as frequently (or more frequently) than the combined, four side faces. Another similar example would be the forward-looking face (e.g., in a moving drone) having an option-4 type array providing increased radar and/or communications coverage in the direction of travel, while other faces would use a shared baseband solution, such as described in option-1.

As shown in FIGS. 8A to 8D, the options may include one or more components, such as one or more controlled array faces 813 which include and/or are connected to one or more of an up/down converter 812, a switch matrix 810, a phase lock loop (PLL) circuitry 816, one or more instances of a splitter or switch 814, an SDR 811 (which may include a microprocessor and/or FPGA), a phased array controller 815, and/or one or more antenna element columns 817, each including one or more antenna elements 817A. In some instances, the SDR 811 could be a software-defined radio, or it could be a communications transceiver of any sort. It can generically represent a modem function with data on one side and modulated RF signals on the other. The disclosed options are configured to include and/or employ one or more such components, in a variety of configurations, depending on a desired use, application, and/or outcome.

Each array face (1 to N) represents a face or side of an overall drone or other assembly (e.g., a ground-based system). Each face may have one or multiple arrays. For example, the assembly may have one array that is time division duplexed between transmit and receive modes, two arrays with one for transmission and one for reception, and/or multiple arrays that may include diverse or multiple-input and multiple-output (MIMO) modes of operation. The arrays may support communications and/or radar operations. An array of the arrays can support alternating operation between communications and radar modes. For example, the array can operate in continuous communications mode, continuous radar mode, and/or alternating between communications and radar within a given timeframe or data collection operation.

The various arrays on a face may share a phased array controller 815 or use separate controllers. These arrays are depicted as sharing a controller in the FIGS. 8A to 8D. Each array face may have one or more arrays. Each array may have one or more phased array controllers. FIGS. 8A-8D show one phased array controller associated with each array face. In some instances, two or more phased array controllers are associated with each array face 813. Antenna element column 817 represents a portion of an array or a sub-array, such that a single phased array controller 815 can be connected to multiple sub-arrays or possibly a complete array if one array controller completely controls the complete array.

As disclosed with respect to option 4, several configurations may support simultaneous operation of the one or more arrays. For example, in a mesh communication scenario, one may use a first face to receive data from a nearby assembly in a first direction, and use a second face to relay information to a second neighbor in a second direction. Another example scenario is where a first face is used for communications (e.g., transmission and/or reception, such as data signals), while a second face simultaneously operates in a radar mode.

In some instances, any node in a mesh network may relay data from one drone to another, thus serving as an intermediary drone or node. In this case, the intermediary drone would support data links in multiple, often but not necessarily different, directions. In some instances, the communications links would be effective in different directions such that different arrays could be used. In some example cases, an intermediary drone may serve as an intermediary node between two drones at an acute angle, such that the same array would be used. This scenario implies the two drones are relatively close to each other, and may use the intermediary to circumvent a barrier or other interference between the two drones.

In some instances, the relay of data through an intermediary drone can be done simultaneously by allocating a radio to each of two separate antenna arrays, each oriented in a different direction. Another solution would be to buffer the data and alternate between multiple arrays and/or alternate between different beam orientations from the same array. In some instances, each link is a half-duplex link, meaning communication is performed in one direction at a time.

Figure 9A:
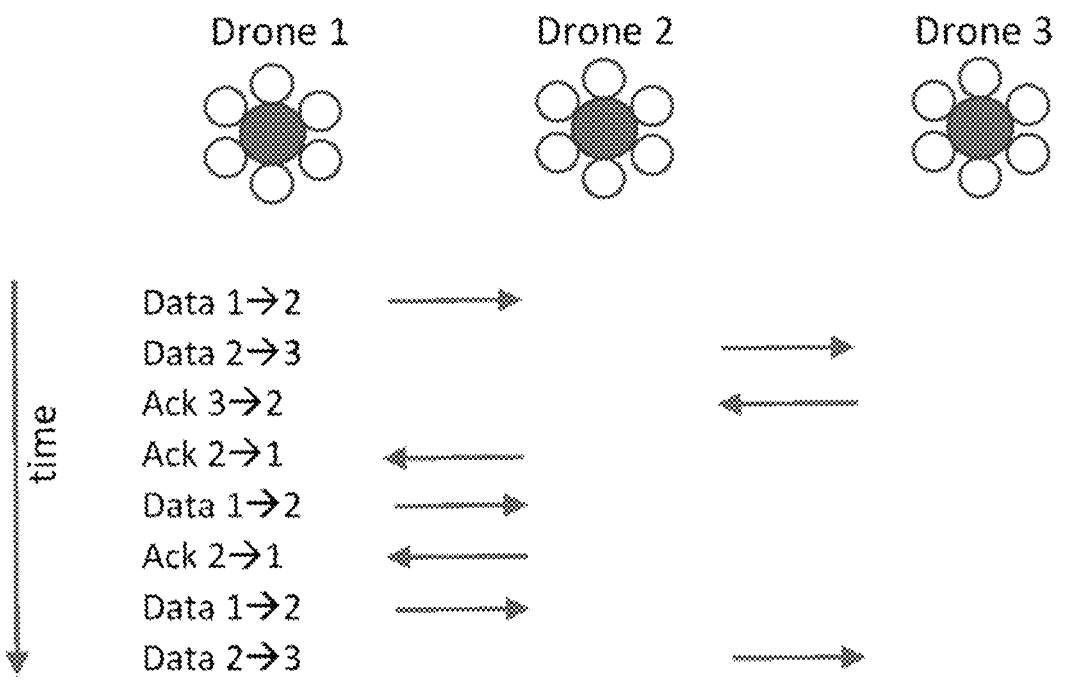
FIGS. 9A and 9B illustrate different example data flow diagrams for communication between drones.
Figure 9B:
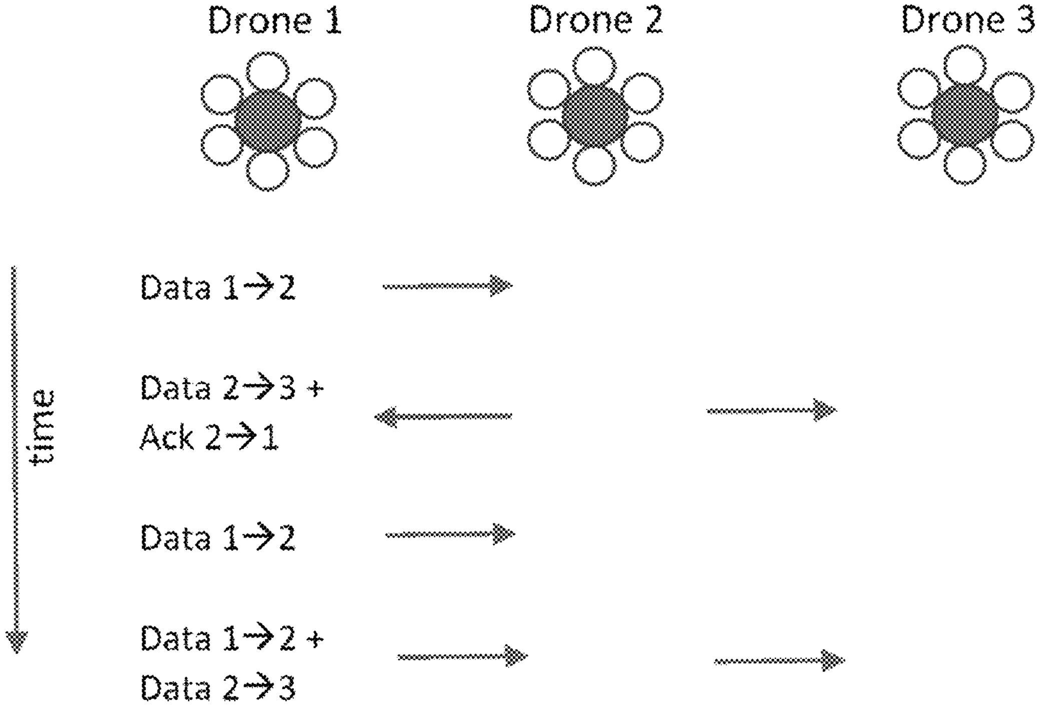

FIGS. 9A and 9B illustrate different example data flow diagrams for communication between drones. Shown in FIGS. 9A and 9B are example data flow diagrams for communication between Drone 1 and Drone 3, with Drone 2 serving as an intermediary node for a half-duplex operation within a mesh network. In the case illustrated in FIG. 9A, only one link is active at a time, such that the path from the SDR to the array is configurable so that the SDR can use any one array at a time. This allows a single communication between Drone 1 and Drone 2, or between Drone 2 and Drone 3, at any given time.

FIG. 9B illustrates employment of a more complex communication scheme and/or radio design relative to the example of FIG. 9A. For example, one or more drones enabled by option 4 allows one drone, Drone 2, to communication in two directions with two different drones, Drone 1 and Drone 3, at the same time, as shown in FIG. 9B. This employs twice the radio resources in each drone, as well as additional signal routing capabilities. For example, Drone 2 is capable of transmitting and/or receiving to/from Drone 1, while simultaneously transmitting and/or receiving to/from Drone 3. In one example implementation, Drone 2 is capable to simultaneously transmit signals to both Drone 1 and Drone 3. In another example implementation, Drone 2 is capable to simultaneously receive a signal from Drone 1 and to transmit a signal to Drone 3. The two signals may be the same (e.g., with the same information, transmission characteristics, from a common antenna, etc.) or may be different from one another. Such simultaneous operation may employ frequency planning techniques and/or different transmission frequencies to avoid or mitigate potential interference.

Figure 10A:
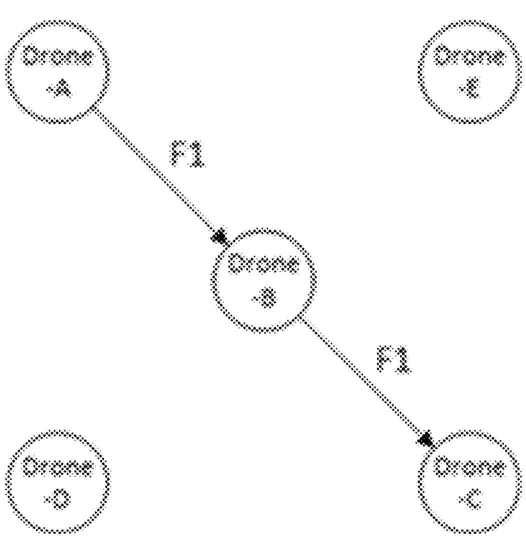
FIGS. 10A and 10B illustrate example frequency schemes, in accordance with disclosed concepts.
Figure 10B:
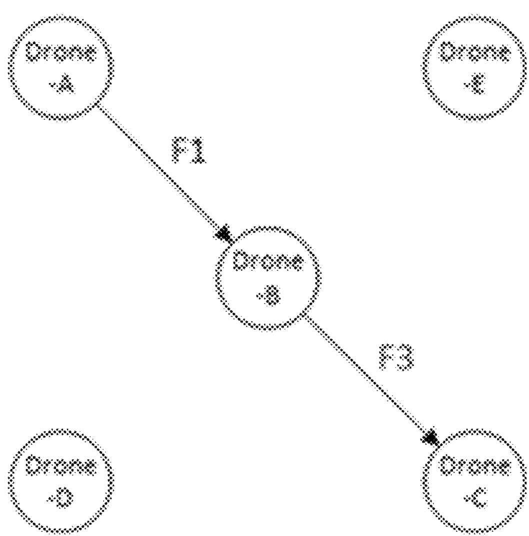

FIGS. 10A and 10B illustrate example frequency schemes, in accordance with disclosed concepts. A system consideration for optimum signal transfer is avoiding or mitigating intra-system interference (e.g., communications from one or more drones interfering with another). For example, a drone swarm may include three or more consecutive drones arranged co-linearly, as shown in FIGS. 10A and 10B. In an example where the drones are evenly spaced, the distance between Drone A and Drone C is twice the distance between Drone B and Drone C.

For free-space propagation, shown in FIG. 10A, the power of a signal F1 reaching Drone C from Drone A (interferer) will be only 6 dB less than the signal power of signal F1 reaching Drone C from Drone B (desired). Without the benefits of coding, for instance, a signal-to-interference ratio (S/I) of only 6 dB will not be adequate to prevent the interferer from causing severe degradation to the desired signal path performance.

There are a number ways to avoid or mitigate such intra-system interference. For instance, as shown in FIG. 10B, a signal F1 between Drone A and Drone B can have one or more characteristics unique from another signal F3 between Drone B and Drone C. In an example, each signal can be coded. In an additional or alternative example, a time-division multiple access (TDMA)-like time sharing technique can be employed. In another additional or alternative example, antenna polarization may be employed to isolate one signal from the other. This may increase the phased array antenna complexity, as each element would be configured to support both polarizations.

In yet another additional or alternative example to avoid or mitigate self-imposed C/I would be a frequency-division multiple access (FDMA)-like technique. The availability of more RF channels allows for a frequency plan to be used within the swarm such that co-linear links would use different channels, as shown in FIG. 10B. An interferer located in an alternate channel (non-adjacent) should be sufficiently rejected by received signal filtering so to not cause significant degradation. The FDMA technique would likely employ multiple channels and/or frequencies to be available. The FDMA technique also may employ more RF filtering. A carrier-sense multiple access (CSMA) approach may be employed in some situations, but may not necessarily avoid interference in the example of FIG. 10B, as Drone B may not know that Drone A was transmitting in the same direction. The TDMA approach may be effective, however, in such a situation.

Note that two links at two different frequencies could be supported with a single SDR. LOs would be chosen to mix the signals to different frequencies in the up/down converter.

The multiple faces may also operate simultaneously at different frequencies if they have the appropriate resources. Multiple links can be supported by the proper configuration of frequency, space, and direction. For example, FIG. 10A shows a case where signal F1 with a first frequency from Drone A to Drone B is reused in the same direction (from Drone B to Drone C) because of spatial separation. In some instances, shown in FIG. 10B, signal F1 with the first frequency is directed to Drone B from Drone A, whereas an additional frequency F3 is directed to Drone C from Drone B.

Figure 11:
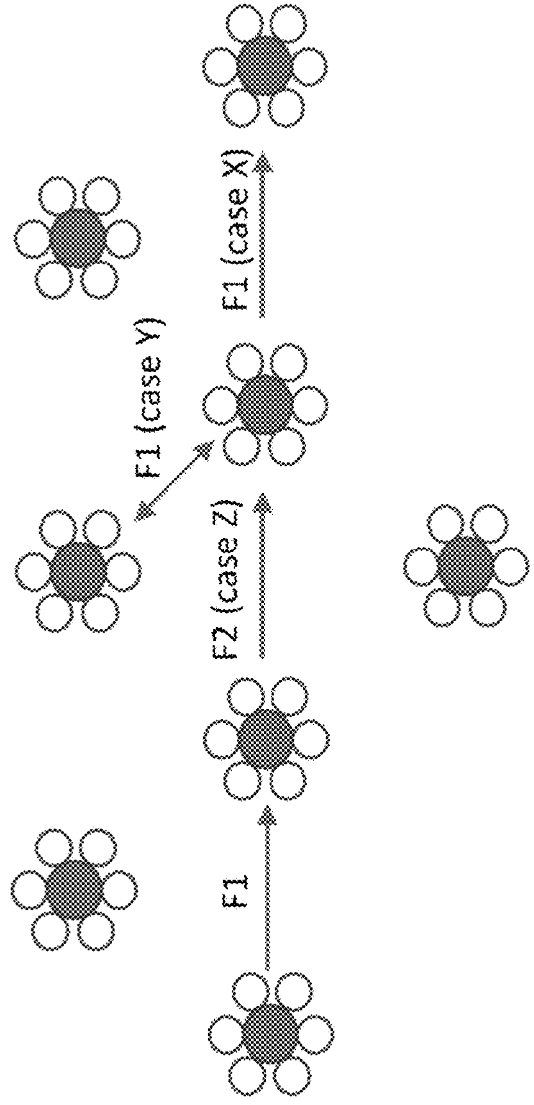
FIG. 11 illustrates an example use of frequencies in communication between drones.
Figure 11:
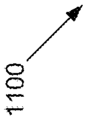

FIG. 11 illustrates an example use 1100 of frequencies in communication between drones. Shown in FIG. 11 (case X) is a signal F1 with the first frequency directed from one node to another node, whereas an additional frequency F2 is received from yet another node. In some additional or alternative examples, signal F1 can be reused when various communications are transmitted in different directions (case Y), and where an additional frequency is used to support an adjacent link (case Z).

In accordance with the present disclosure, dual-mode communication dual-mode high-speed communications and radar devices (or modules) are provided, and are configured for supporting dual-mode data communication and radar operations, particularly in mesh networks that may comprise mobile nodes, such as aerial drones. Such dual-mode modules may be preferably configured to be compatible with, and optimized for integration into aerial drones. As noted use of dual-mode modules may be desirable as there is clear need for solutions that support both modes—that is, radar sensing and data communication-particularly in mesh networks comprising aerial drones. With respect to radar sensing, there is a market need for a low size, weight, power, and cost (SWaP-C) radars with mid-range performance. There is a need for smaller radars that may be deployed on drones that still allow the drone to fly and carry a payload. There is also a need for deployable radar systems that may be installed on fence posts, buildings, or even deployed in portable settings, being capable of operating from a small solar panel. In general, the need to detect flying objects at low altitudes may dictate the shift from large, centralized radars to more distributed deployments (e.g., smaller radars deployed on many platforms, including moving ones). There is also a market need for a high-speed, long-range communications device with low size, weight, power, and cost (SWaP-C).

With respect to dual-mode operations, there is a non-linear benefit from having the two modes combined in one module. For example, the ability to operate in communications mode may provide a network capability for the radar mode, such as for a rapidly deployable radar sensing capability with very little infrastructure overhead (e.g., not requiring cables to be trenched or other radio networks and antenna systems to be deployed). This may be true for ground-based and airborne-based applications. Further, radar, as a sensor, may need to be connected to networks and the cloud to make the information actionable and exponentially more useful. A dual-mode radar and communications system (e.g., one incorporating dual-mode modules as described herein) may make sensing capability easily deployable, such as compared to ground-based radars or the like. In this regard, a ground-based radar module typically includes either an operator at the location to interpret the results on the spot, or what would typically be a fixed installation with a mounting structure, power supply systems including a connection to the energy grid, and a telecommunications interface back to the cloud or private network.

The communications network interface would often be a fiber or dedicated data lines that of often trenched in the ground. In some cases this is done with a wireless network, but with a substantial structure for the antennas and equipment. This invention allows the radar to be installed in an ad-hoc manner or at a fixed site, but enables simple connections such as a light and small mounting bracket, often to a pole or building, a basic power connection such as a 110V AC outlet and/or solar panel both with or without a battery backup. These features are enabled by the low SWAP-C characteristics of the radar. Furthermore, the dual-mode aspect allows the radar itself to act as its own communications node. As part of the mesh network, the mesh may include a node that serves as the radar observation point where the radar data is consumed, and/or the mesh may include a node that provides access to the cloud or other private networks using a wired or wireless configuration. This is a unique capability enabled by this invention. Contrast the resulting solutions: a) a radar, antenna structure, large power supply system, dedicated/installed network connections and often a building or structure to house all of this, compared to b) a small radar that simply be mounted on a pole or attached to a building or even taped to a tree with either a 110V AV plugin or a solar panel.

Further, use of such dual-mode radar and communications system may allow for sensing aggregation. Sensing or sensor aggregation relates to networks of sensors that work together. One example is a shift from a single, large/high power central radar to a model where a large number of radars are distributed over a geographical region to provide better localized coverage and also work together by sharing the detections and tracks such that different vantage points can be used to create a more complete combined set of detections and tracks than any one radar. This concept can also be used for various types of sensors such as optical, infrared, LIDAR, and others. Sensing in isolation—that is, where a single sensor has only one vantage point—has limited benefit. Building networks of sensors results in benefits that are larger than just the number of sensors in the system. In many cases a sensor may be deployed in an area with limited commercial network coverage (e.g., 5G, LTE, Wi-Fi hotspot, wired connection(s), etc.). This may be particular in remote settings, such as oil fields, infrastructure such as power lines and rail lines through uninhabited areas, areas with natural disasters, and regions of military engagement, etc. The ability to have one device that may provide both sensing and data communication (particularly at high rates) is valuable. In summary, solutions that incorporate use of modules with low SWaP-C, and which support both radar and communication modes, offer considerable improvement over existing (conventional) solutions, and yield considerable benefits.

Solutions based on the present disclosure may address various challenges. Such challenges may include SWaP-C requirements of the market, especially for portable and airborne applications. Suitable devices (e.g., modules) should have the ability to be mounted on a drone and not diminish the drone's payload and range capabilities; size, weight, and power attributes; the ability to provide radar sensing function for medium range applications (between automotive and conventional military apps). Further, cost should not be greater than the host platform (or a fraction of it). Traditional radar implementations are large and expensive, often with complex assemblies and exotic materials (building radios at >15 GHz and especially above 20 GHz was difficult). This may pose challenges when using more mainstream technologies while still achieving high performance. This may be addressed by use of innovative circuitry, particularly silicon integrated circuits, for phased array controllers and supporting mmWave circuits coupled with 5G cellular communications which when used in dual-mode modules as described herein. Another challenge is facilitating dual-mode capability that provides the necessary functions of sensing and communications in one module, thus reducing the overall SWaP-C. Another challenge is utilizing radar as a sensor, which may sense using radio energy (electromagnetic waves) to enable re-using the RF circuitry for communications modes too. As such, in dual-mode modules based on the present disclosure the sensor may be a radar that may have its own link to the internet. Another challenge is utilizing suitable bands. Traditionally radars operate at mmWave frequencies and off-the-shelf communications systems operate at L, S, and C band (e.g., Part 15 bands at 900 MHZ, 2.4 GHz, and 5 GHz including Wi-Fi, Bluetooth, Zigbee, and other point-to-point systems). In other words, radars typically operate in dedicated bands that are different from bands used in other communication systems, and as such dual-mode operation may not be readily apparent. Furthermore, the design approach or philosophy started from cell phone design concepts including leveraging of integrated circuits, simplified mechanical construction, simplified/minimal interconnects, integration of many different functions on one PCB, and an overall though of being lightweight and disposable. Contrast this with many radar systems that start from a military foundation that may elect to use exotic materials for fractional increases in performance, a focus on higher power/higher performance systems, compartmentalized construction and assembly techniques, expensive connectors, and a need to address all military ruggedization requirements. The system was architected to leverage the commercially available phased array controller capabilities without the need for external higher power amplifiers and associated circuitry.

Solutions based on the present disclosure may address various issues, limitations, and shortcomings of radar solutions. For example, automotive radars may offer low SWaP-C but such radars are optimized for short detection ranges, which may be insufficient in mesh networks, especially with mobile nodes. Further, these automotive radars do not, and are not configurable to provide data communication external to the car. Conventional military radars, including supposed low SWAP-C military radars, may not meet many of the requirements of such mesh networks and their environment—they tend to be high power (e.g., >100 W), tend to be large and heavy (e.g., 10s of pounds in weight), and tend to be expensive (e.g., costs of >$100,000). More importantly, today's offerings generally include individual radar modules and communications modules—that is, there are no dual-mode modules available, especially at low SWaP-C level, such as the dual-mode modules described herein. In this regard, existing offerings may include Wi-Fi modules (which has limited range and operates in crowded frequency bands), point to point, tactical radios (which support limited data rates and also operates in unlicensed bands, cellular modems (e.g., LTE, 5G, etc., which requires coverage from cellular operators, monthly fees), and the like.

Solutions based on the present disclosure may utilize techniques that are simpler and more optimized for dual-mode operations, such as using frequency-modulated continuous-wave (FMCW) techniques for the radar sensing. The proposed dual-mode modules also offer advantages, particularly with respect performance, over solutions that may combine sensors (radars) with existing commercial off-the-shelf (COTS) communications systems as the speed/bandwidth that such COTS communication systems offer is not sufficient, especially over long ranges. In some implementations, the approach may be to switch the mode and thus the waveform, but use the same RF circuitry, phased array antennas, and elements of the baseband processing. This allows each mode to be optimized for its role. In communications mode, the software defined radio may be used to modulate and demodulate the communications signals. Alternatively, communications modules that include the communications modulation and demodulation functions may be leveraged.

Solutions based on the present disclosure may incorporate various features to address the various challenges noted herein and/or to overcome the various issues, limitations, and shortcomings of any existing conventional solution(s). In particular, in various embodiments based on the present disclosure, dual-mode radar and communications module—that is, single physical module incorporating components for facilitating both radar (sensing) and data communication—are provided, which also have low SWaP-C to ensure that they may be deployed in mesh networks, particularly in mobile nodes therein, such as aerial drones. These dual-mode modules may comprise phased array antennas for small size, high gain, and electronic antenna steering. Further, these dual-mode modules may have shared components with custom configuration to implement both needed functions with one set of hardware. Having two systems in one solution reduces hardware cost, implementation issues (size, mounting, power, etc.), which removes the need for communications between radar and communication modules. Further, to optimize performance, both modes may operate at optimal frequency (e.g., mmWave frequencies), and optimal radar sensing techniques, such as frequency-modulated continuous-wave (FMCW) techniques. While some existing communication (e.g., 5G) and radar solutions may be configured to operate in mmWave frequencies, they do not use same frequencies if/when they are combined with another modalities—e.g., are optimized for the dedicated mode of operation (e.g., 5G communications) and do not support other modes of operation such as radar.

FIGS. 12 to 18 illustrate example communication solutions that may be configured or used in providing dual-mode operations, in accordance with example embodiment(s) of the disclosures.

Figure 12:
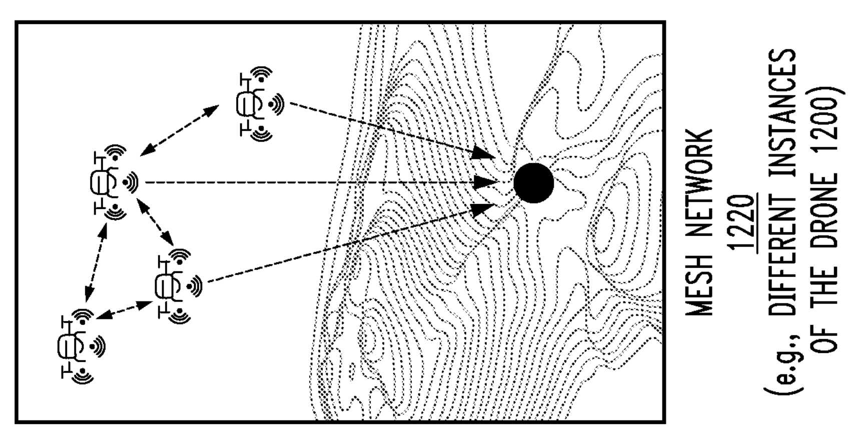
FIG. 12 illustrates an example drone that may be configured for supporting dual-mode solutions.
Figure 12:
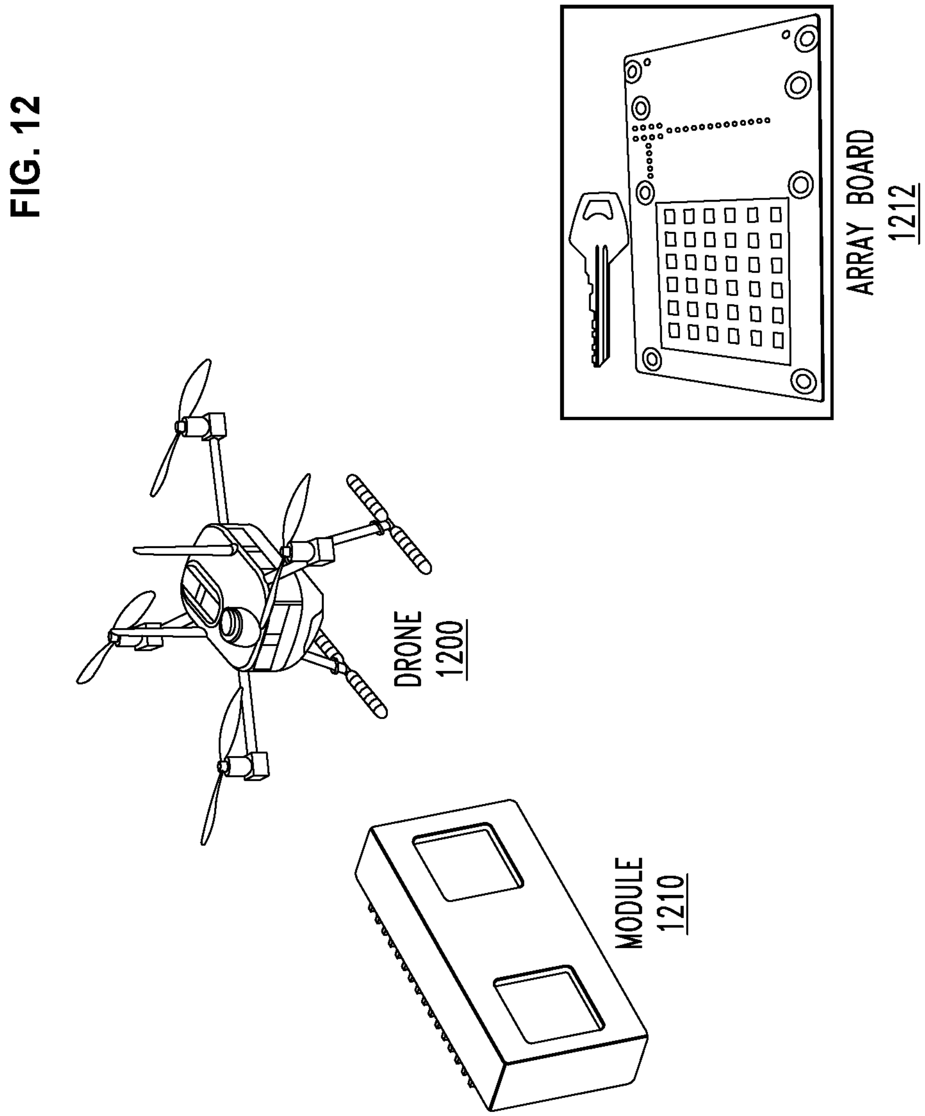

FIG. 12 illustrates an example drone that may be configured for supporting dual-mode solutions. Shown in FIG. 12 is an aerial drone 1200. The drone 1200 may comprise suitable circuitry and other resources (e.g., hardware or otherwise) to facilitate operation in accordance with the present disclosure.

For example, the drone 1200 may comprise radar(s), other sensor(s), communication module(s), and processors (e.g., central processing unit (CPU) processors, graphics processing unit (GPU) processors, etc.). In some instances, the drone 1200 may be configured to facilitate or support use of advanced computing/processing based operations, such as artificial intelligence (AI) based operations. Circuitry and other components (e.g., hardware or otherwise) embedded in (or otherwise made available to) the drone 1200 may be configured to support various advanced computing based tasks, such as real-time artificial intelligence (AI) computing/processing and data analytics, which may be used in conjunction with radar angular resolution related functions.

In some instances, in various networks, particularly mesh networks (e.g., mesh network 1220), network nodes, particularly drones (e.g., the drone 1200), may be modified to support and/or optimize dual-mode high-speed data communication and radar sensing. This may be done by use of modules configured to enable and support dual-mode operations. In various instances, such dual-mode module may be designed and/or implemented as a single physical module configured to support and facilitate support of both radar sensing and data communication modes, such as by incorporating suitable components configured to facilitate and enable transmission and reception of signals for data communication and radar sensing, and for processing such signals.

For example, as illustrated in FIG. 12, the drone 1200 may incorporate one or more dual-mode modules 1210. Such dual-mode modules (e.g., the dual-mode module 1210) may represent an example implementation of dual-mode high-speed communications and radar size, weight, power, and cost (SWaP-C) system compatible with drones. This may be done by configuring the dual-mode module 1210 to utilize antenna related components that are sufficiently small in size but which may be utilized for facilitating signal communication for use in radar sensing and data communications. For example, the dual-mode module 1210 may incorporate array board(s) 1212 with embedded antenna array elements therein as well as circuitry for enabling use of the antenna array in radar sensing and data communications. As illustrated in FIG. 12, such array boards may be preferably small in size and/or weight (e.g., less than 1.5 pounds, no more than few inches on a side, etc.) to facilitate use in modules deployed in aerial nodes. Examples of such array boards are described in more detail below.

Use of dual-mode high-speed data communication and radar sensing may offer various benefits and/or advantages over existing solutions (if any). For example, support of dual-mode operations, particularly by use of dual-mode modules, may enable and/or enhance operation of autonomous swarms of drones (solely, or in conjunction with other network nodes, including fixed nodes). Such dual-mode modules may allow for establishing and operating high-speed (e.g., mmWave based) mesh networks, which may allow for substantial improvement in range over conventional solutions (e.g., up to 50× over conventional ranges, such as up to 200 Mbps at 1 km, extendable indefinitely through the mesh network). Also, dual-mode modules may incorporate innovative lightweight radar capabilities at disruptive price point, which may allow for considerable cost saving (e.g., 10× lower price for radar). Further, dual-mode based systems (e.g., incorporating dual-mode modules) and/or dual-mode operations based thereon, may also allow for various modes of operation—e.g., 1: Many operation and Many: Many operation.

The use of radars enables autonomous navigation and target tracking, which is critical for optimal performance of aerial drones. In this regard, radar is a key element of DAA (detect-and-avoid) solutions. Dual-mode operations would allow for continued radar use even while providing data communication.

Use of advanced and/or enhanced processing techniques, such as artificial intelligence (AI) and machine learning (ML), allows for enhanced processing and/or handling of data, which may further improve decision making with respect to the operation of the network and its various elements. In some instances other types of sensing (e.g., optical sensing) may be used. This may allow for further improvement—e.g., use of optical sensing for security solutions. The use of AI and ML can improve the radar track output by classifying or identifying the type of target (ex. drone, plane, bird, person, etc.) and also stitch multiple tracks together for a more complete track history. AI/ML can also be used in the communications mode to identify nodes in the mesh, the mesh structure, and how to optimize routes through the mesh considering factors such as number of hops, quality/data rate of each hop, and how to distribute data to optimize the overall network.

While various embodiments are described herein in the context of drones and use thereof, the disclosure is not limited to drones, and solutions based on the present disclosure may be applied to other platforms and/or systems, such as unmanned aerial vehicle (UAVs), robots, vehicles, wearables, and ground-based sensor nodes. In various instances, different types of installations may be combined/integrated into, and may operate collaboratively in autonomous swarms.

Figure 13:
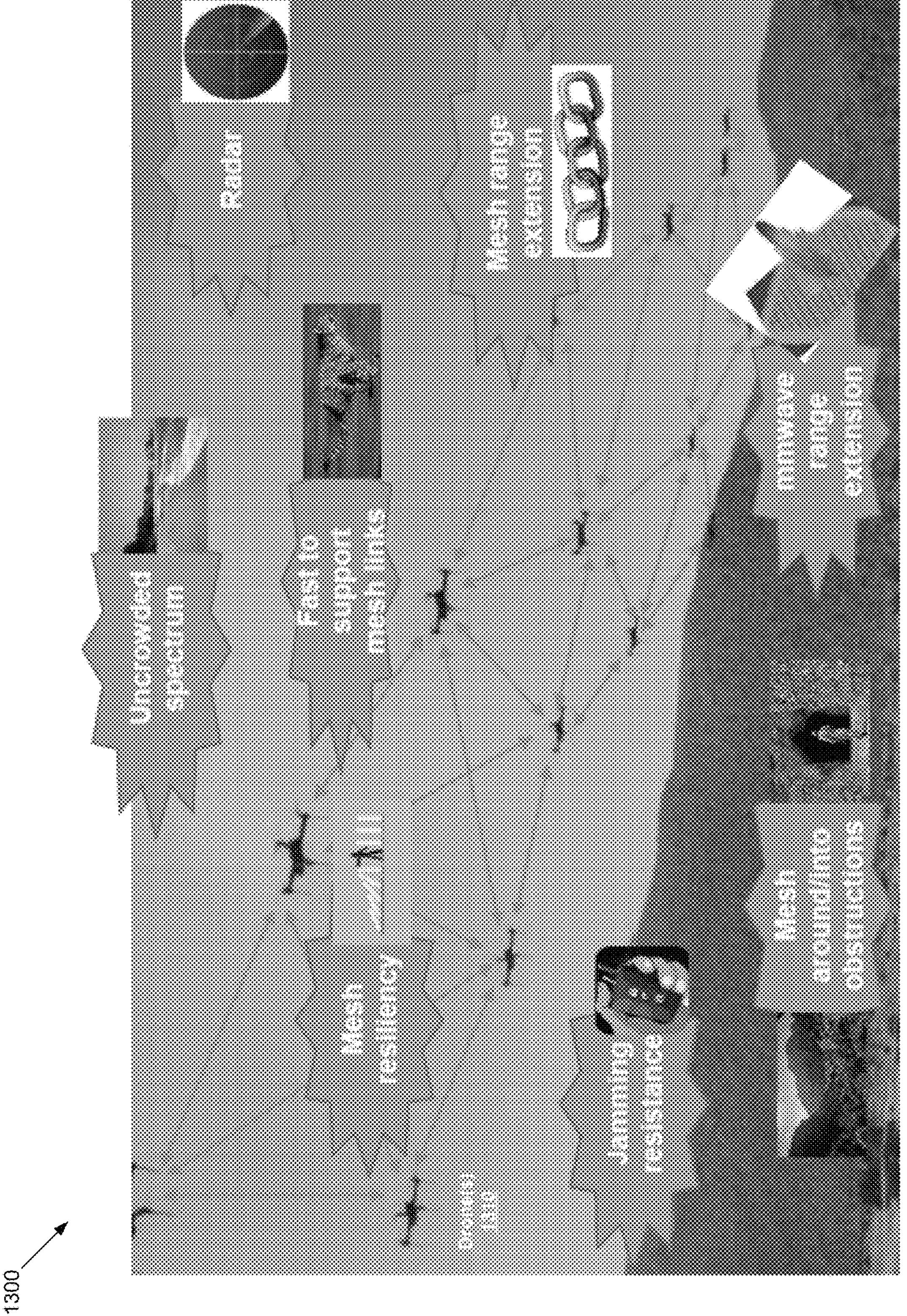
FIG. 13 illustrates an example network formed by a plurality of aerial drones that may be configured for supporting dual-mode solutions.

FIG. 13 illustrates an example network formed by a plurality of aerial drones that may be configured for supporting dual-mode solutions. Shown in FIG. 13 is a network 1300 of aerial drones 1310 forming a mesh network (e.g., mmWave based mesh network).

As noted, support of high-speed data communication and radar sensing may allow for improved performance. This may be particularly the case when utilizing such dual-mode operation in a plurality of drones. In particular, use of drones configured for dual-mode operation may allow for high performance drone swarm operations, such as by configuring and utilizing autonomous swarms of drones. The creation of a high speed mesh network for a drone swarm would enable rapid sensor sharing, distributed computing among the drone nodes, and coordinated sensing operations such as coordinated inspection of an object by multiple drones from multiple angles. Nonetheless, there may be some challenges that may arise in such dual-mode operation. For example, in such use scenarios, data communication (e.g., Wi-Fi based communication) may pose some challenges, such as with respect to range and/or interference.

Solutions based on the present disclosure may overcome such challenges while still maintaining support of dual-mode operation—that is, data communication in combination with radar sensing. This may be done, e.g., by utilizing mmWave high gain steerable antennas within a mesh network. Further, to ensure and/or enhance ease of operation, a frequency band and architecture that leverages commercial 5G technology may be utilized. This may ensure low-cost in volume deployment. In addition, software defined radios may be used for multimode flexibility. Also, advanced processing techniques, such as artificial intelligence (AI) based processing, may be utilized (e.g., for radar processing and mesh optimization) to further enhance and optimize performance.

Accordingly, solutions based on the present disclosure, in which systems may be configured for supporting dual-mode radar sensing and data communications (e.g., by use of specialized dual-mode modules as described herein), may be used to provide smart, autonomous devices. In summary, solutions based on the present disclosure may incorporate such technical features and/or offer such benefits as: 1) electronically steerable phased array antenna(s), configured to have high gain, focused energy providing long range operation (e.g., 5× better than Wi-Fi), with focused antenna beam that provide jamming/interference reduction, and steerable antenna to get the most out of the energy available; 2) mesh networking, which may allow for range extension by daisy-chain of links, may provide multiple network paths for link redundancy/resiliency, and may offer the ability to route around obstructions; 3) use of mesh networking in conjunction with phased arrays, which may allow for enhanced jamming/interference resistance by selecting paths and focused energy away from interferers, may allow for reduced probability of detection, and may offer increased security; 4) spectrum selection, which may allow for selection in uncrowded spectrum which translates into improved link availability and range, may yield substantial improvement (e.g., 50×) over Wi-Fi systems, may allow for use of wide bandwidth to support high speed data, and may allow for use of antenna element sizes that accommodate array sizes sufficient for high gain, steerable arrays; 5) software defined radios, which offer flexibility, supporting dual-mode communications and radar operation, and allowing for rapid development; 6) security enabled by trusted platform modules, which allow for tamper monitoring, secure booting, hardware accelerated cryptographic functions, and/or secure key storage; and 7) optimized SWaP-C (e.g., sufficiently low) for drones and similar deployable systems. And 8) radar modes of operation Example embodiments incorporating dual-mode solutions based on the present disclosure are illustrated and described in more detail with respect to FIGS. 14 to 18.

Figure 14:
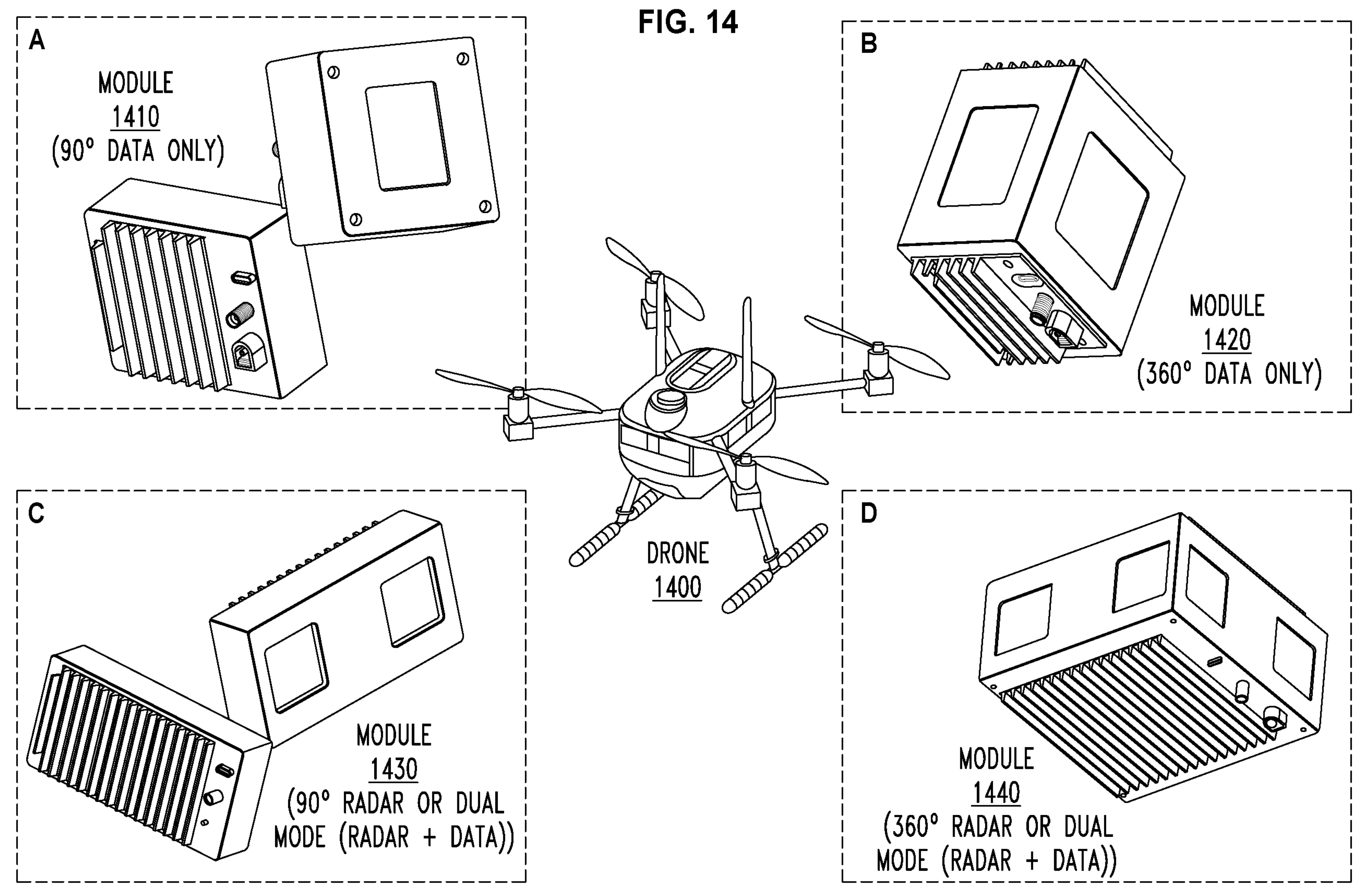
FIG. 14 illustrates an example drone that may be configured for supporting dual-mode solutions.

FIG. 14 illustrates an example drone that may be configured for supporting dual-mode solutions. Shown in FIG. 14 is an aerial drone 1400, and various alternative modules 1410, 1420, 1430, and 1440, that may be used (e.g., incorporated or embedded) therein.

Illustrated in FIG. 14 is drone integration of different types of modules, including dual-mode modules. In this regard, the modules 1410, 1420, 1430, and 1440 may support different (and alterative) operation combinations, with respect to modes of operations and/or coverage area. For example, as illustrated in FIG. 14, modules 1410 are configured to provide or support data communication only, and have 90° coverage, modules 1420 are configured to provide or support data communication only, and have 360° coverage, modules 1430 are configured to provide or support radar and/or dual-mode (i.e., radar-plus-data), and have 90° coverage, and modules 1440 are configured to provide or support radar and/or dual-mode (i.e., radar-plus-data), and have 360° coverage. Accordingly, drones (e.g., the drone 1400) may integrate dual-mode modules, such as modules 1430 and/or modules 1440, to enable operation in accordance with the present disclosure as described herein. For example, a device that included phased array antennas on a single face may support 90 degree operation. A device with antennas on all 4 faces may support 360 degree operation. The devices with only one phased array antenna per face would support a communications-only mode, since it can operate in a TDD mode and alternate the use of the antenna for transmission and reception. The devices with two phased array antennas per face would support dual mode operation. In radar mode, one antenna is the transmitter and the other antenna is the receiver.

Figure 15:
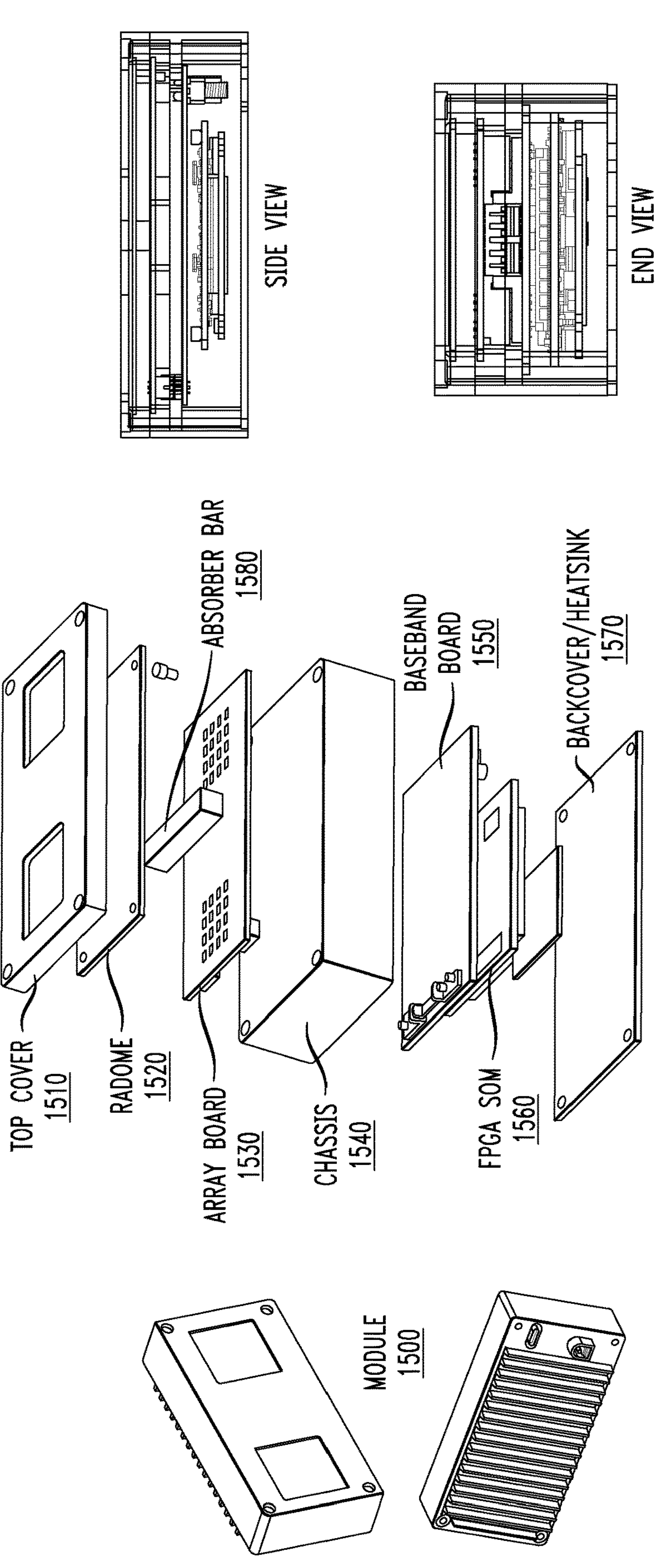
FIG. 15 illustrates an example dual-mode module.

FIG. 15 illustrates an example dual-mode module. Shown in FIG. 15 is dual-mode module 1500. Shown in FIG. 15 is a mechanical design of an example dual-mode module implemented based on the present disclosure.

As illustrated in FIG. 15, the example dual-mode module 1500 may comprise a chassis 1540 with a top cover 1510 and back cover 1570, forming internal space for housing the remaining components of the modules. The back cover 1570 may incorporate and/or may function as heatsink, for dissipating heat generated within the housing (e.g., due to operation of circuitry and/or communication components therein). The internal component may comprise an array board 1530 disposed near the top cover 1510, with a radome 1520 covering the array board 1530 (for protection thereof).

In some instances the radome 1520 may serve the purpose of the top cover, and thus only one piece is used—that is, the top cover 1510 and the radome 1520 are replaced by a single piece (e.g., radome).

The array board 1530 may comprise a suitable circuitry based board with an array of embedded antenna elements therein. The array board 1530 may be configured for operation as, e.g., phased array antenna. Other components may comprise suitable circuitry for providing processing functions (including control), such as to facilitate the communication of signals via the array board 1530, and processing of data obtained from and/or embedded into communicated signals. For example, as shown in the implementation illustrated in FIG. 15, dual-mode module 1500 comprises a baseband board 1550 and a field-programmable gate array (FPGA) system-on-a-module (SOM) 1560 for providing the necessary processing and control functions. Further illustrated in FIG. 15 is an end view and side view of the dual-mode module 1500, showing the components thereof, once fully assembled. The FPGA and processors do not have to be implemented as a SoM. For example, the FPGA and processor functions, memory, and supporting circuits (e.g., power management) may be implemented as separate devices.

In some instances, the dual-mode module 1500 may be designed and/or configured to optimize antenna isolation. Such antenna isolation may be provided by the use two separate antenna arrays on the array board 1530, and additionally by use of an RF absorbing material (e.g., absorber bar 1580 shown in FIG. 15 just above the array board) placed between the first phased array antenna and the second phased array antenna. Further, the chassis 1540 may have cavities for different circuit blocks, which may help in isolating the circuit functions. In one example embodiment, the isolation between transmission and reception is at least 90 dB.

Figure 16:
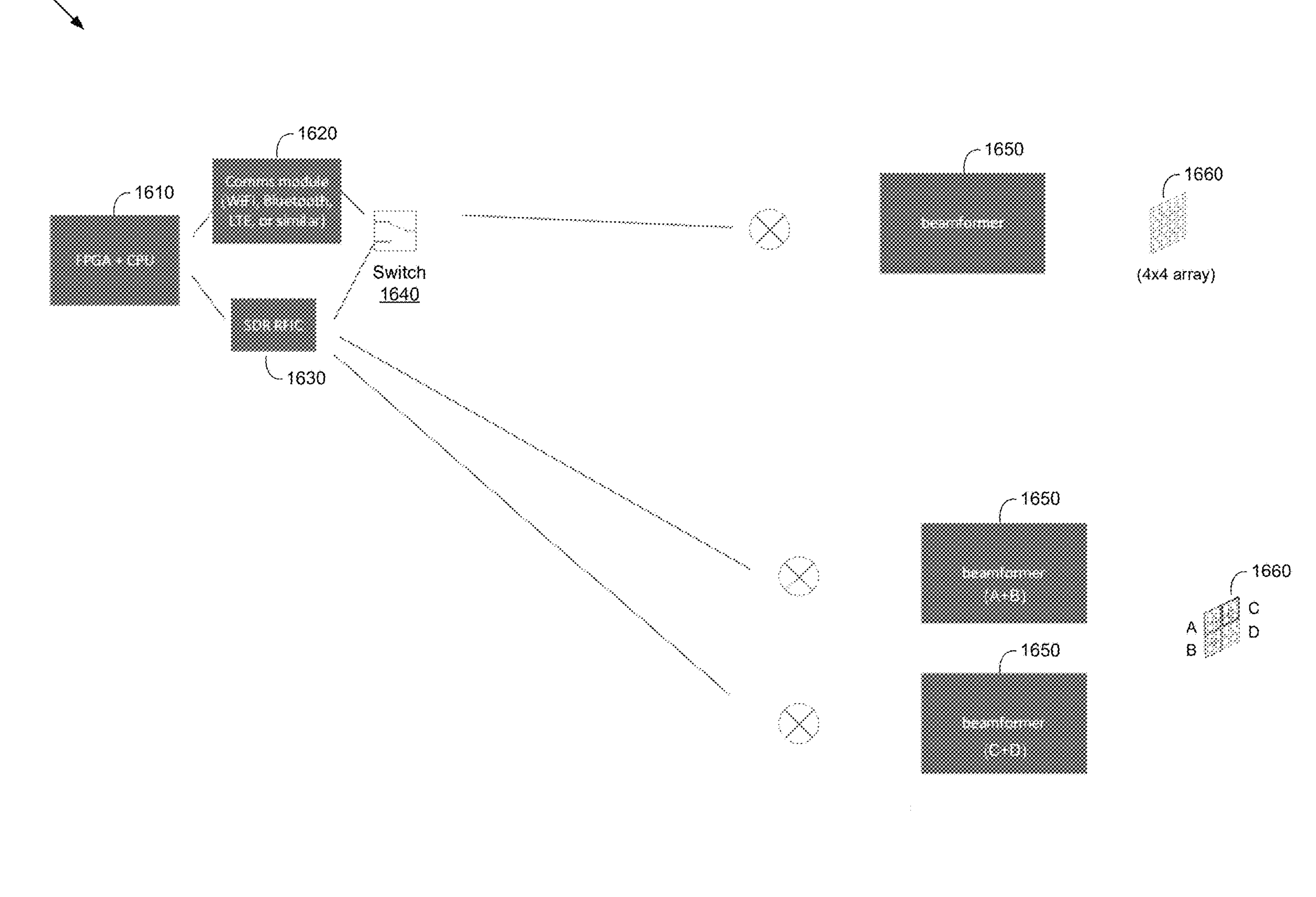
FIG. 16 illustrates an example dual-mode module.

FIG. 16 illustrates an example dual-mode module. Shown in FIG. 16 is dual-mode module 1600. FIG. 16 is a block diagram of an example dual-mode module implemented based on the present disclosure, and illustrates example use case associated therewith. The dual-mode module 1600 may represent a block (functional) diagram representation of the dual-mode module 1500 of FIG. 15.

As illustrated in FIG. 16, the example dual-mode module 1600 may comprise a processor (e.g., microprocessor, such as central processing unit (CPU) and field-programmable gate array (FPGA)) 1610, a communication block 1620, a software-defined radio (SDR) radio-frequency integrated circuit (RFIC) 1630, a switch 1640, a beamformer 1650, and an antenna array 1660. Each of these components may comprise suitable circuitry and other resources (e.g., hardware or otherwise) configured to perform functions and/or operations attributed to that component, and/or to support performing functions and/or operations attributed to the system as a whole.

The processor (FPGA+CPU) 1610 may be configured to function as a controller, and to provide signal processing (e.g., radar signal processing and communication signal processing). The communication block 1620 may be configured to operate as a communications mode modem, facilitating communication of data based on one or more different communication protocols/interfaces (e.g., Wi-Fi, Bluetooth, LTE, or similar). The SDR/RFIC 1630 may be configured to operate as a radar modem (modulator/demodulator). The switch 1640 may be configured to allow for switching between radar and communication modes, such as by switching connection to the beamformer 1650 (and thus the array 1660) between the radar path (via the SDR/RFIC 1630) and the data communication path (via the communication block 1620).

The array 1660 may comprise a plurality of array (antenna) elements, arranged to enable transmission and reception of signals in particular manner. For example, the array 1660 may be configured to facilitate, e.g., use of beamforming. As illustrated, the array 1660 may be configured as 24 GHz array with 16 array elements. The beamformer 1650 may be configured to facilitate beamforming during transmission/reception via the array 1660. The beamformer provides the function of gain and/or phase adjustment for each of the antenna elements, as well as amplification. For example, in the implementation illustrated in FIG. 16, where the array 1660 comprises 16 array elements, the beamformer 1650 may be configured to generate and utilize 4 separate beams, using 4 sections (A, B, C, and D) of the array 1660.

In operation, the dual-mode module 1600 may be configured to provide data communications mode and/or radar mode based operation. This may entail configuring the dual-mode module 1600, particularly by configuring or modifying one or components thereof, to facilitate one or more of communications transmission (TX), communications transmission (RX), radar transmission (TX), and radar reception (RX). In this regard, radar RX may be combined, and as such may be separated into 2 pieces in the dual-mode module 1600, to enable monopulse operation. The monopulse may be implemented by phase detection on one axis and amplitude detection on the second axis. Amplitude detection may be enabled by beam squinting. For example, the receive array may be split into two portions. In some cases this may be an even split of the array. The two portions of the array each have a dedicated receiver path that allows for unique signal processing. One can compare the phase difference between the two portions to determine the angle of arrival of the reflected signal (the target). This satisfies determination of the angle orthogonal to the direction of the split between the array portions.

For example, this may produce the azimuth angle or one axis. To achieve angle of arrival resolution in the direction orthogonal the first determined angle (e.g., in elevation), one may use amplitude squinting to create an imbalance in the amplitude response of the two portions along the second (elevation) angle or second axis. For example, one portion may be intentionally steered 10 degrees above the nominal antenna direction and the second portion may be steered 10 degrees below the nominal antenna direction. If for example the reflected signal from the target arrived at an angle 10 degrees above the nominal antenna direction, a comparison of the two amplitudes would show that the portion of the antenna steered 10 degrees above the nominal antenna direction would have a higher signal output. This amplitude comparison is done using the same two receiver paths. This hybrid approach of using phase and amplitude techniques allows for a minimal number of receive paths while still producing the bi-directional angle resolution that is desired. The radar already produces a good representation of range, so that combining range, azimuth, and elevation angles would let the radar locate an object in three dimensional space.) The array 1660, and the beamformer 1650, may collaboratively operate to facilitate signal transmission and reception accordingly.

For example, for radar TX or communications TX/RX, the array 1660 may be configured (as a whole) for use in radar TX, for use in communications TX/RX, or for use in communications TX. For radar RX, half (½) the array 1660 (e.g., using array sections A and B (A+B) or array sections C and D (C+D)) may be configured for use in radar RX. As such, the receiver array may be used for communications RX (with appropriate intermediate frequency (IF) path switching). It is possible for one array to be used for radar TX plus communications TX/RX and the second array to be used for radar RX and communications RX or scanning/searching for communications nodes.

In various example implementations, a node operates within a mesh network, the node including one or more directional antennas configured to communicate with at least two supplemental nodes via one or more radio frequency (RF) links. In some instances, the one or more directional antennas include first and second directional antennas, the first directional antenna configured to receive a first signal from a first supplemental node and the second directional antenna to receive a second signal from a second supplemental node simultaneously.

In some instances, the one or more directional antennas include first and second directional antennas, the first directional antenna configured to receive a first signal from a first supplemental node and the second directional antenna to transmit a second signal to a second supplemental node simultaneously.

In some instances, the one or more directional antennas include first and second directional antennas, the first configured to transmit a first signal to a first supplemental node and the second configured to transmit a second signal to a second supplemental node simultaneously.

In some instances, the one or more directional antennas include a first antenna configured to communicate with two supplemental nodes. In some instances, the first antenna is configured to communicate with a first supplemental node, and the second antenna is configured to communicate with a second supplemental node simultaneously.

In some instances, the node may incorporate a switching mechanism operable to communicate information through the first or the second directional antenna.

In some instances, the one or more directional antennas are configured as electronically steerable. In some instances, the one or more directional antennas are configured to scan an area over a predetermined angle. In some instances, a combination of a scanned area of two or more of the one or more directional antennas provides 360 degree coverage for the node.

In some instances, the node or the supplemental nodes are flight enabled drones. In some instances, the drones are capable of autonomous flight.

In some instances, the node or the supplemental nodes are a wheeled vehicle drone. In some instances, the node or the supplemental nodes are collocated with a robotic system. In some instances, the node or the supplemental nodes are communications assemblies configured to be secured to a fixed support and to maintain the RF link. In some instances, the fixed support is a tower or a vehicle mount.

In some instances, the one or more directional antennas are phased array antennas. In some instances, the phased array antenna is steered electrically. In some instances, the phased array antenna has a beam width of less than 45 degrees. In some instances, the phased array antenna has at least sixteen elements.

In some instances, a phased array controller may be connected to each of the one or more antennas. In some instances, each of the one or more antennas includes one or more antenna elements, the phased array controller operable to selectively enable the one or more antenna elements to control beam patterns for the one or more antennas.

In some instances, the one or more directional antennas include first and second antennas, wherein a first RF link originates from the first directional antenna and the second directional antenna receives a second RF link. In some instances, the first directional antenna is arranged on a first surface of the node and the second directional antenna is arranged on a second surface of the node. In some instances, the first directional antenna is operable to focus on a first region of interest from the node, and the second directional antenna is operable to focus on a second region of interest from the node.

In some instances, the one or more RF links of the mesh network are formed of RF links in the 1 GHz band or higher.

In some instances, the node may incorporate one or more of a signal converter, a splitter or switch, a switch matrix, a software defined radio (SDR), or a phase lock loop (PLL) circuit. In some instances, the switch matrix may alternate between first and second directional antennas of the one or more directional antennas to receive first and second signals from one or more of the least two supplemental nodes. In some instances, the SDR may be operable to communicate with two or more of the one or more directional antennas via the switch matrix.

In some disclosed examples, a method of communicating with multiple nodes in a mesh network includes providing an RF mesh network of three or more nodes, each node including one or more antennas; generating a first RF signal at a first antenna located on a first node of the three or more nodes; generating a second RF signal at a second antenna located on a second node of the three or more nodes; and receiving the first and second RF signals at one or more directional antennas located on a third node of the three or more nodes.

In some instances, the one or more directional antennas include first and second antennas, and the method further comprises transmitting information corresponding to the first RF signal from the first directional antenna of the third node to the first or second nodes; and transmitting information corresponding to the second RF signal from the second directional antenna of the third node to one of the first and second nodes simultaneously with the first directional antenna.

In some instances, the first RF signal is transmitted with a first frequency and the second RF signal is transmitted with a second frequency.

In some instances, the third node comprises a first and a second side, the first directional antenna located on the first side and the second directional antenna located on the second side. In some instances, the method includes receiving the first RF signal at the first directional antenna and receiving the second RF signal at the second directional antenna.

In some instances, the node or the supplemental nodes are drones capable of autonomous flight. In some instances, the node or the supplemental nodes are communications assemblies configured to be secured to a fixed support and to maintain the RF link. In some instances, the fixed support is a tower or a vehicle mount. In some instances, the one or more directional antennas is a phased array antenna. In some instances, the phased array antenna is steered electrically.

In some disclosed examples, a node operating within a communications network includes a radio frequency (RF) antenna configured to communicate with one or more supplemental nodes via one or more RF links; and a radar antenna configured to collect data in an area of interest.

In some instances, the RF antenna communicates RF signals with the one or more supplemental simultaneously while the radar antenna collects data. In some instances, the RF antenna is configured to receive a RF signal from the one or more supplemental nodes and transmit to the one or more supplemental nodes. In some instances, the communications network is a mesh communications network.

In some disclosed examples, a node operating within a communications network includes an array supporting radio frequency (RF) communication with one or more supplemental nodes via one or more RF links, and radar data collection in an area of interest.

In some instances, the array can support alternating operation between RF communications and radar modes. In some instances, the array can operate in one or more of a continuous RF communications mode, a continuous radar mode, or an interleaved mode alternating between RF communications and radar within a given timeframe or data collection operation.

Figure 17:
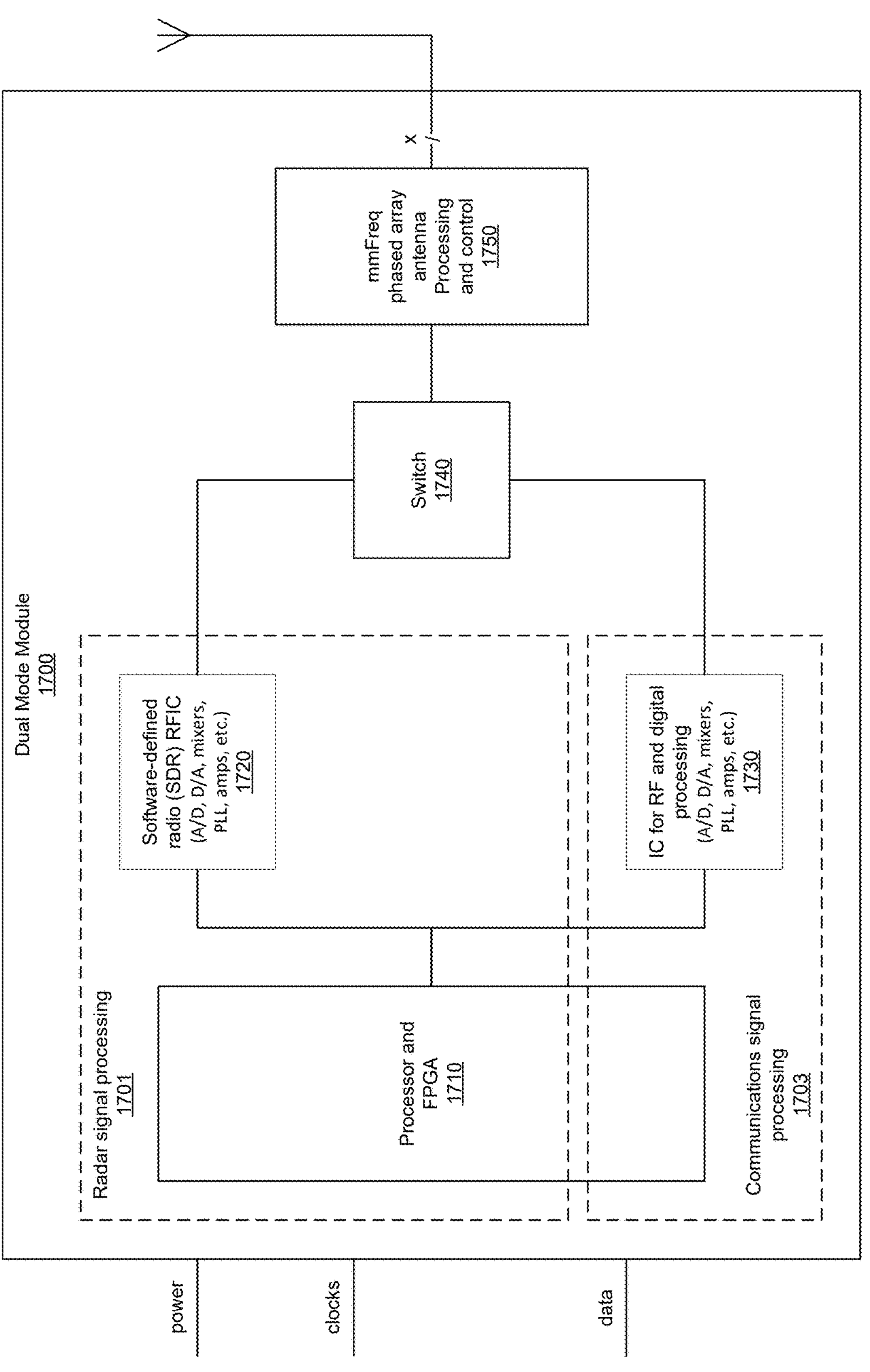
FIG. 17 illustrates high level block diagram of an example dual-mode module.

FIG. 17 illustrates a high level block diagram of an example dual-mode module. Shown in FIG. 17 is a dual-mode module 1700. The dual-mode module 1700 may be configured to support dual-mode operation—that is, radar sensing and data communication—in mobile and relatively small network nodes, such as aerial drones, as described herein. The dual-mode module 1700 may be optimized for deployment in such platform, and as such may support operation in both modes, and doing with high performance (e.g., with respect to detection range, data rates, etc.), while meeting low size, weight, power, and cost (SWaP-C) requirements.

As shown in FIG. 17, the dual-mode module 1700 comprises processor and field-programmable gate array (FPGA) 1710, software-defined radio (SDR) radio-frequency integrated circuit (RFIC) 1720, integrated circuit (IC) for radio-frequency (RF) and digital processing 1730 (simply referred to as processor 1730), a switch 1740, and millimeter frequency (mmWave) phased array antenna processing and controller 1750 (simply referred to as processor/controller 1750). The dual-mode module 1700 (or components thereof) may be arranged such that it may effectively incorporate two separate processing blocks: radar signal processing block 1701 and a communications signal processing block 1703. However, as illustrated in FIG. 17, some elements (e.g., the processor/FPGA 1710) may be shared, and may be used to provide functions needed for each mode. In other words, within the radar signal processing block 1701 and a communications signal processing block 1703 some elements may overlap (that is, be shared and used by both), and some do not.

In operation, the dual-mode module 1700 may operate in radar mode or communication mode, and may switch back and forth between these modes. The dual-mode module 1700 may be configured (e.g., by incorporating suitable ports or the like) to receive various power, to receive clocking (and/or other control) signals, and/or may to receive and/or forward data (e.g., corresponding to, or associated with radar detection and/or data communication by the dual-mode module 1700). The clocking/control signals may comprise timing related signals, such as frequency reference signals, global timing reference signals, etc. Communication signal processing path and radar signal processing path may be set up within the dual-mode module 1700, each comprising one or more components of the dual-mode module 1700, with at least some of the components being shared by both paths. For example, the processor/FPGA 1710 may be configured to provide and/or handle radar related data processing, while doing little (if anything) during communication mode. In this regard, in communication mode the processor/FPGA 1710 may be configured to, e.g., merely route data to/from communication path.

The SDR/RFIC 1720 may be configured to provide and/or handle radar related signal processing functions. As such, the SDR/RFIC 1720 may comprise circuits for handling various signal processing functions, such as analog-to-digital (A/D) convertor(s), digital-to-analog (D/A) convertor(s), mixer(s), phase-locked loop circuit(s), amplifier(s) (amps), etc. Similarly, the processor 1730 may be configured to provide and/or handle data communication related signal processing functions. As such, the processor 1730 may comprise circuits for handling various signal processing functions, such as analog-to-digital (A/D) convertor(s), digital-to-analog (D/A) convertor(s), mixer(s), Phase-locked loop circuit(s), amplifier(s) (amps), etc.

The antenna related components (e.g., the processor/controller 1750 and the antenna(s)) may be shared between the communication path and the radar path, and as such the switch 1740 may be configured to switch connection to antenna related components between the radar path (e.g., via the SDR/RFIC 1720) and the communication path (the processor 1730). In this regard, in the path to the antenna, 'x' indicated number of elements in the antenna array. As noted, in some instances, during radar mode operation, the antenna (s) may be configured to utilize beam steering.

In some instances, some of the components described herein may be eliminated or combined. For example, the switch 1740 (as physical component) may be eliminated, with the switching being effectively done by other means—e.g., by activating (or deactivating) certain components that correspond to the one of the modes. For example, during radar mode operation, the processor 1730 may be deactivated, and as such the communication path as a whole would be deactivated, whereas during communication mode operation, the SDR/RFIC 1720 may be deactivated, and as such the radar path as a whole would be deactivated.

In some instances, the dual-mode module 1700 may be configured to manage power use adaptively, based on the mode. For example, radar signal processing may typically require more power, and as such more power may need to be obtained and/or provided when operating in radar mode compared to operating in communication mode.

Figure 18:
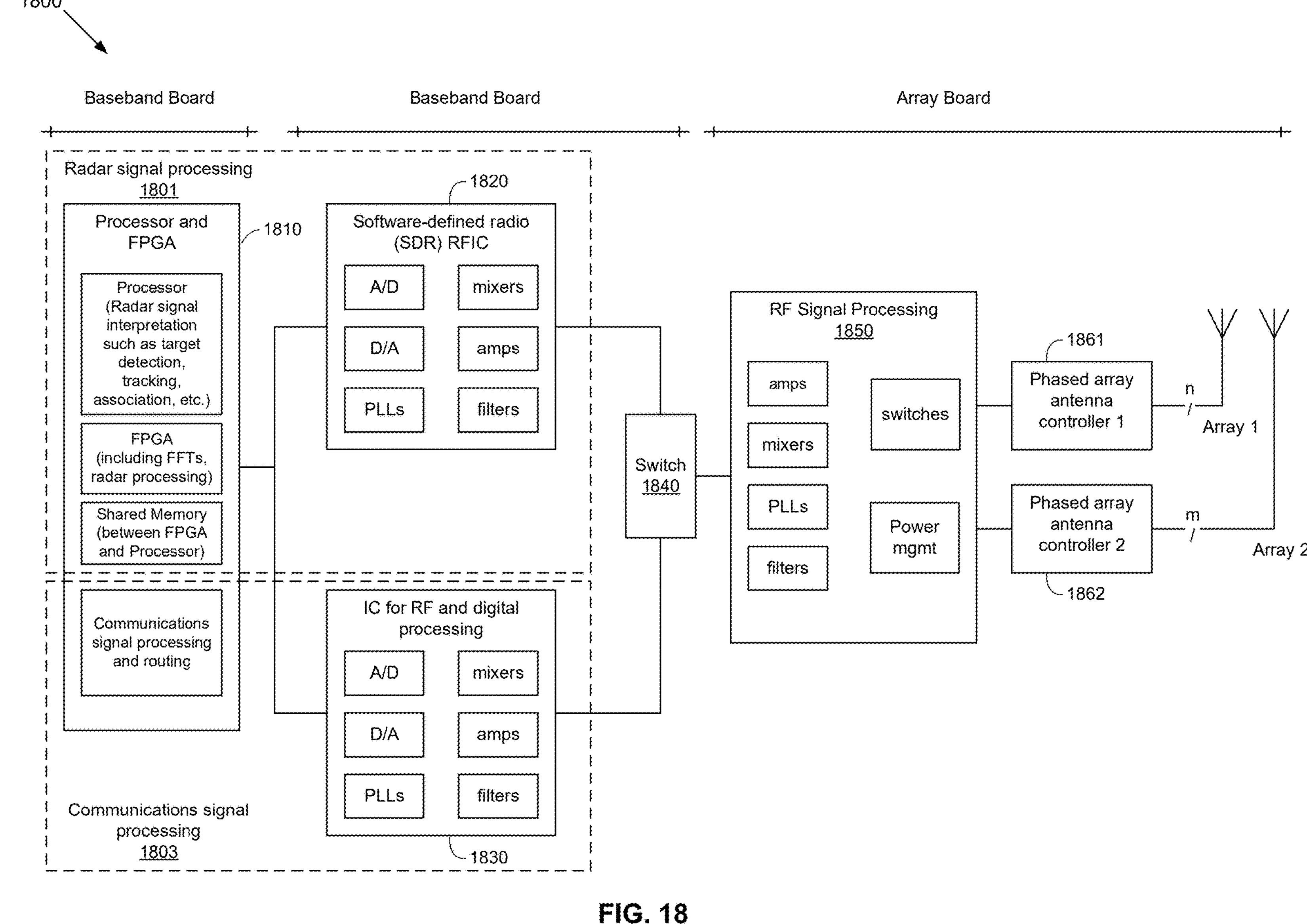
FIG. 18 illustrates a more detailed block diagram of an example dual-mode module.

FIG. 18 illustrates a more detailed block diagram of an example dual-mode module. Shown in FIG. 18 is dual-mode module 1800. In this regard, the dual-mode module 1800 is substantially similar to the dual-mode module 1700, and represents an example embodiment thereof, illustrating more details of the module as a whole and various components thereof. As such, as with the dual-mode module 1700, the dual-mode module 1800 may be similarly configured to support dual-mode operation, and may be optimized for deployment and optimized performance in small platforms such as aerial drones, particularly when operating in mesh networks, as described herein.

As illustrated in FIG. 18, the dual-mode module 1800 comprises processor and field-programmable gate array (FPGA) 1810, software-defined radio (SDR) radio-frequency integrated circuit (RFIC) 1820, integrated circuit (IC) for radio-frequency (RF) and digital processing 1830 (simply referred to as the processor 1830), a switch 1840, radio-frequency (RF) signal processing (circuit) 1850 (simply referred to as processor 1850), and phased array antenna controllers (circuits) 1861 and 1862 (simply referred to as controllers 1861 and 1862).

As shown the dual-mode module 1800 may incorporate two separate antennas (or antenna arrays), each controlled by a corresponding one of the controllers 1861 and 1862.

The processor 1850 and the controllers 1861 and 1862 may, collectively, correspond to the processor/controller 1750 in the dual-mode module 1700, and as such may provide similar function(s) as in the dual-mode module 1800. In the path to the antennas, 'n' and 'm' indicate number of elements in each of the antenna. 'n' and 'm' may be equal or different (however, where the dual-mode module 1800 represents an embodiment of the dual-mode module 1700, x is same as n+m).

As with the dual-mode module 1700, the dual-mode module 1800 (or components thereof) also may be arranged such that it may effectively incorporate two separate processing blocks: radar signal processing block 1801 and a communications signal processing block 1803.

In operation, the dual-mode module 1800 may operate in radar mode or communication mode, and may switch back and forth between these modes as described with respect to the dual-mode module 1700. During operation of the dual-mode module 1800 components in the dual-mode module 1800 may operate in substantially similar manner as similarly named components in the dual-mode module 1700. The dual-mode module 1800 may similarly receive power, clocking (or other control) signals, and/or may be configured to receive or forward data (e.g., corresponding to, or associated with radar detection and/or data communication by the dual-mode module 1800), and a communication path and a radar path may be similarly set up within the dual-mode module 1800, each comprising one or more components of the dual-mode module 1800, with at least some of the components being shared by both paths.

For example, the processor/FPGA 1810 may be configured to provide and/or handle radar related data processing, while doing little (if anything) during communication mode—e.g., merely route data to/from communication path. The processor/FPGA 1810 may comprise circuits for handling various data processing functions pertinent to supporting radar mode and communication mode operations. For example, as shown in FIG. 18, processor/FPGA 1810 may comprise a radar processor sub-unit for handling radar signal interpretation (e.g., target detection, tracking, association, etc.), a FPGA sub-unit (for handling fast Fourier transforms (FFTs), radar processing, etc.), a shared memory sub-unit (e.g., shared between FPGA and processor sub-units), and a communications processor sub-unit for handling communication related signal processing and routing. Nonetheless, while these sub-units are shown as separate (physical) sub-components, the disclosure is not limited to such implementations, and as such one or more of these sub-units may be implemented as virtual or logical sub-units using common physical circuitry in the processor/FPGA 1810.

Further, the SDR/RFIC 1820 may be configured to provide and/or handle radar related signal processing functions, whereas processor 1830 may be configured to provide and/or handle data communication related signal processing functions. The SDR/RFIC 1820 may comprise circuits for handling various signal processing functions, such as analog-to-digital (A/D) convertor(s), digital-to-analog (D/A) convertor(s), mixer(s), phase-locked loop circuit(s), amplifier(s) (amps), filter(s), etc. Similarly, the processor 1830 may comprise circuits for handling various signal processing functions, such as analog-to-digital (A/D) convertor(s), digital-to-analog (D/A) convertor(s), mixer(s), phase-locked loop circuit(s), amplifier(s) (amps), filter(s), etc.

The processor 1850 may be configured to provide and/or handle RF signal processing functions relating to operating the antenna arrays. The processor 1850 may comprise circuits for handling various signal processing functions, such as mixer(s), phase-locked loop circuit(s), amplifier(s) (amps), filter(s), etc. In addition, the processor 1850 may comprise circuits for power management (e.g., managing power used during transmission of signals via the antenna arrays), and switches which may be used in switching between arrays and/or among array elements (e.g., when utilizing beam steering, etc.). The controllers 1861 and 1862 may be configured to provide and/or handle control functions relating to operating the antenna arrays and/or array elements therein. For example, the controllers 1861 and 1862 may be configured to control or manage gain and/or phase parameters assigned to array elements, creating and managing multiple channels, etc.

The antenna related components (e.g., the processor 1850, the controllers 1861 and 1862, and the antenna(s)) may be shared between the communication path and the radar path, and as such the switch 1840 may be configured to switch connection to antenna related components between the radar path (e.g., via the SDR/RFIC 1820) and the communication path (the processor 1830).

Further, as with the dual-mode module 1700, in some instances, some of the components described herein may be eliminated or combined. For example, the switch 1840 (as physical component) may be eliminated, with the switching being effectively done by other means—e.g., by activating (or deactivating) certain components that correspond to the one of the modes. For example, during radar mode operation, the processor 1830 (and the communications processor sub-unit of the processor/FPGA 1810) may be deactivated, and as such the communication path as a whole would be deactivated, whereas during communication mode operation, the SDR/RFIC 1820 (and the radar processor sub-unit and the FPGA sub-unit of the processor/FPGA 1810) may be deactivated, and as such the radar path as a whole would be deactivated.

Nonetheless, it is to be understood that the implementation details of the dual-mode module 1700 and the dual-mode module 1800 are not limiting, and that some instances some of the details may vary (e.g., boundaries may be split differently) without affecting the overall of operation and/or performance of the modules (and the systems incorporating these modules), particularly with respect to the support and use of dual-mode operations as described herein.

In some instances, an array board may be used, with at least some of antenna related components (e.g., the antenna(s) at least some of the antenna processing and/or control circuitry, and even the switches) incorporated into the array board, etc. For example, in an example embodiment, the antenna(s) may be integrated into a printed circuit board (PCB), with the antenna(s) on one side of the PCB, and at least some of the antenna processing and control circuitry (e.g., at least a portion of the processor/controller 1750 and (optionally) the switch 1740 in the dual-mode module 1700; at least a portion of the controllers 1861 and 1862 and (optionally) the processor 1850 and/or the switch 1840 in the dual-mode module 1800) on the other side. In some instances, the PCB may be implemented as a multi-layer PCB.

Use of antennas in dual-mode modules, such as the dual-mode module 1700 and the dual-mode module 1800, may be optimized for dual-mode operations. For example, the antenna array(s)) may be configured to be electronically steerable (e.g., in azimuth and elevation). As such, beam steering may be used, such as during radar sensing and/or for optimal peer-to-peer data communication. Further, the antenna array(s) may be adaptively managed for transmit (TX) and receive (RX). For example, in implementations such as the dual-mode modules 1800 incorporating two arrays, each array may be only capable of sending or receiving. Alternatively, switching techniques may be used to switch between arrays, to enable RX/TX bidirectional capability (both arrays may be used to transmit/receive). Thus, during radar mode operations, for example, one array (e.g., array 1) may be used for transmit (TX) while another array (e.g., array 2) is used for receive (RX). In such implementations, during data communication mode, one or both arrays may be used. Further, in some instances, in such implementations one array may be used for data communication (RX/TX) while the other array is used for radar scanning and tracking.

In some instances, suitable multiplexing techniques, such as time-division duplexing (TDD), may be used. This may be particularly done during data communication mode. Further, suitable radar sensing techniques are used, selected to ensure optimal performance. For example, in some instances, frequency-modulated continuous-wave (FMCW) techniques are used for the radar sensing.

In some instances, the dual-mode modules implemented in accordance with the present disclosure may meet various physical and/or performance requirements. For example, the dual-mode modules may need to meet certain weight requirements (e.g., <5 lbs., and preferably 1 lb. or less), certain size requirements (e.g., approximately 5"×3"×1.5"), certain power requirements (e.g., 30 W at 100% duty cycle, and/or <50 W), certain detection requirements (e.g., for radar operation, be able to detect flying objects with size and speed of light single-engine aircraft (e.g., Cessna 172 or the like) at 2 km, and/or to detect small flying objects with size and speed similar to golf balls at 250 m), and/or certain communication requirements (e.g., >100 Mbps at 1 km).

Accordingly, solutions in accordance with the present disclosure, such as the dual-mode module 1700 and the dual-mode module 1800 may offer various benefits and/or improvements over conventional solutions, if any existed. Some of these benefits and/or improvements are summarized in Table 2, below:

| Attribute | Proposed Modules Benefit(s) | Conventional Solution(s) |
|---|---|---|
| Radar | Radar that enables new sensing applications on small drones and portable use models, providing a new sensing modality to these markets | SWaP-C too big to be easily deployable, or too short of a range to be useful |
| Communications | mmWave mesh communications that provides long-range high-speed mesh networks | Limited data rates from tactical radios limit the mesh functionality<br>Standards such as Wi-Fi don't have sufficient range<br>None offer mmWave directional antenna mesh networking |
| Dual-mode operation | This invention brings a deployable dual-mode capability to the market | Didn't exist |
| Size | Size reduced by a factor of 3 compared to previous solutions | Technology choices and implementation result in a module that is too big to fly on many drones |
| Weight | Weight reduced by a factor of 3 compared to previous solutions | |
| Power | Power reduced by a factor of 2 compared to previous solutions | |
| Technology Selection | Highly integrated silicon phased array controllers, silicon mixers and PLLs produce smaller overall size, reduced cost, simplified assembly.<br>Integrated FPGA plus ARM CPUs, custom SDR solution with RFIC and FPGA implementation. | Complex technology and assembly, including, e.g., non-integrated GaAs modules plus separate CMOS controllers (wire bonded modules, many modular components in individual compartments).<br>Metamaterial antenna steering techniques. |

An example system, in accordance with the present disclosure, comprises a dual-mode module configured to support a plurality of operation modes comprising at least a radar mode and a data communications mode, dual-mode module comprising: one or more antennas comprising at least a first phased array antenna and a second phased array antenna; one or more processing circuits configured for handling communication via the one or more antennas, the one or more processing circuits are shared between at least the radar mode and the data communications mode; one or more frequency generation circuits shared between at least the radar mode and the data communications mode; one or more power management circuits shared between at least the radar mode and the data communications mode; and one or more power switching circuits configured for facilitating switching between at least the radar mode and the data communications mode; wherein one of the first phased array antenna and the second phased array antenna is configurable for radar transmission and other one of the first phased array antenna and the second phased array antenna is configurable for radar reception; wherein at least one of the first phased array antenna and the second phased array antenna is configurable for use in the data communications mode; and wherein the dual-mode module switches between operation as a radar module and operation as a communications module. The dual-mode module may be optimized for deployment on such platforms as aerial drone, a golf ball, a post, and an autonomous ground vehicle. In this regard, operating in the radar mode comprises transmission of a radio signal, with the radar reception comprising capturing a reflection of the signal (e.g., from objects within the field of view) using the second phased array. Operating in the data communication mode comprises transmission of data via a radio signal to a corresponding node and/or reception of data from that corresponding node.

In an example embodiment, the dual-mode module is configured to utilize frequency-modulated continuous-wave (FMCW) when operating as a radar module.

In an example embodiment, the dual-mode module is configured to utilize time-division duplexing (TDD) when operating as a communications module.

In an example embodiment, the dual-mode module is configured to utilize antenna isolation techniques. The antenna isolation may need to meet some criteria, such as providing a certain level of isolation (e.g., at least 90 dB of isolation) between transmission and reception. The antenna isolation may be achieved by use of antennas (e.g., two antennas) on a common PCB, with the antennas separated by a ground region. Further, in some instance an absorber material may be disposed between the antennas. The system may further comprise an RF absorbing material between the first phased array antenna and the second phased array antenna.

In an example embodiment, the dual-mode module further comprises a printed circuit board (PCB) that comprises at least some of the one or more antennas.

In an example embodiment, the PCB comprises one or more antenna elements implemented on one side of the PCB and circuitry, for controlling operation of the one or more antenna elements, on the other side of the PCB.

In an example embodiment, the dual-mode module further comprises one or more phased array controllers.

In an example embodiment, the dual-mode module is configured to use one of the first phased array antenna and the second phased array antenna for both of radar transmit and communications transmit and receive.

In an example embodiment, the dual-mode module is configured to use other one of the first phased array antenna and the second phased array antenna for radar reception.

In an example embodiment, the dual-mode module is configured to select or arrange two portions of at least one of the first phased array antenna for monopulse communication.

In an example embodiment, the dual-mode module is configured to form two dedicated receive paths for handling monopulse reception via the two portions.

In an example embodiment, the dual-mode module is configured to arrange or set up two separate receive paths based on monopulse communication, and wherein the arranging or setting up comprises utilizing phase for one axis and amplitude using squinting for second axis.

In an example embodiment, the one or one or more processing circuits comprise at least one of a phase lock loop (PLL) circuit, an up/down converter circuit, an amplifier circuit, and a mixer circuit.

In an example embodiment, the dual-mode module further comprises at least two separate signal processing circuits for handling at least a portion of signal processing functions for each of radar communication and data communication.

In an example embodiment, the at least two separate signal processing circuits are implemented in at least two separate integrated circuits.

In an example embodiment, the dual-mode module is configured to switch between the two separate signal processing circuits to facilitate switching between the radar mode and the data communications mode.

In an example embodiment, the dual-mode module is configured to utilize a frequency plan that supports both of the two separate signal processing circuits.

In an example embodiment, the dual-mode module further comprises a field-programmable gate array (FPGA) configured for processing radar waveforms.

In an example embodiment, the dual-mode module is configured to utilize or apply time alignment between paths when operating in one or both of the radar mode and the data communications mode, and/or switching between the radar mode and the data communications mode.

In an example embodiment, the dual-mode module is configured to switch between the radar mode and the data communications mode based on a switching scheme, wherein the switching scheme comprises use of time division multiplexing (TDM). In some example embodiments, the switching may be based on priority—that is, one of the two modes is the highest priority for the installation. This may depend on the primary role assigned to the module when installed—e.g., a communication module that supports radar (if possible), or a radar module that supports communication (if possible). For example, where the module is installed in, and/or operate as a mesh node that can switch to radar, such switching may only be done if there is no mesh traffic. Similarly, where the module is installed in, and/or operate as radar node, the radar node may be configured complete its scan volume on a periodic basis, and then use down time for data communications (if needed), or the radar node may complete scanning a prescribed volume and then relays the output of the scan results back through the network. The switching scheme may comprise a higher priority for the radar mode, and/or a higher priority for the data communications mode.

In an example embodiment, the dual-mode module is configured to operate at frequencies in one or more millimeter waves (mmWave) bands during at least the radar mode and the data communications mode.

In an example embodiment, the dual-mode module is configured to operate at K-band frequencies.

In an example embodiment, the one or more antennas comprise an antenna having a plurality of antenna elements, and wherein the first phased array antenna and the second phased array antenna are formed using a first subset and a second subset of the plurality of antenna elements.

In an example embodiment, the plurality of antenna elements comprises no more than 50 antenna elements.

In an example embodiment, the plurality of antenna elements comprises 16 antenna elements.

In an example embodiment, the dual-mode module is configured to support mesh networking based communications when operating as a communications module.

In an example embodiment, the dual-mode module is configured to meet one or more predetermined mesh properties when supporting or providing the mesh networking based communications. The one or more predetermined mesh properties may comprise or be related to link redundancy, range extension, having excess bandwidth, ability to accommodate a large mesh network without any (or minimal) performance degradation, use of mmWave frequencies enable small, steerable directional antennas, Directional antennas offer ability to steer around jammers or interference.

In an example embodiment, the dual-mode module is configured to meet predetermined size, weight, power, and cost (SWaP-C) requirements, wherein the size, weight, power, and cost (SWaP-C) requirements are determined based on one or more types of platforms where the dual-mode module is deployed, and the one or more types of platforms comprise at least aerial drones. The A dual-mode module may have minimal power requirement (e.g., 30 W at 100% duty cycle, and/or <50 W), and/or may weigh less than 1.5 lbs.

In an example embodiment, the dual-mode module comprises a calibration path for radar calibration, wherein the calibration path comprises radar transmit path and radar receive paths, and wherein the calibration path further comprises both radar receive path and communication receive path.

In an example embodiment, the at least one of the one or more antennas is configurable to operate as a steerable directional antenna.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It is to be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While various spatial and directional terms, such as top, bottom, lower, mid, lateral, horizontal, vertical, front and the like may be used to describe embodiments, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the disclosed technology is not limited in its application to the details of construction and the arrangement of the components set forth in the description or illustrated in the drawings. The technology is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:

a dual-mode module configured to support a plurality of operation modes comprising at least a radar mode and a data communications mode, the dual-mode module comprising:

one or more antennas comprising at least a first phased array antenna and a second phased array antenna;

one or more processing circuits configured for handling communication via the one or more antennas, wherein the one or more processing circuits are shared between at least the radar mode and the data communications mode;

one or more frequency generation circuits shared between at least the radar mode and the data communications mode;

one or more power management circuits shared between at least the radar mode and the data communications mode; and one or more switching circuits configured for facilitating switching between at least the radar mode and the data communications mode;

wherein one of the first phased array antenna and the second phased array antenna is configurable for radar transmission and other one of the first phased array antenna and the second phased array antenna is configurable for radar reception;

wherein at least one of the first phased array antenna and the second phased array antenna is configurable for use in the data communications mode; and wherein the dual-mode module switches between operation as a radar module and operation as a communications module.

2. The system of claim 1, wherein the dual-mode module is configured to utilize frequency-modulated continuous-wave (FMCW) when operating as a radar module.

3. The system of claim 1, wherein the dual-mode module is configured to utilize time-division duplexing (TDD) when operating as a communications module.

4. The system of claim 1, wherein the dual-mode module is configured to provide at least 90 dB of isolation between transmission and reception.

5. The system of claim 4, wherein the system further includes an RF absorbing material between the first phased array antenna and the second phased array antenna.

6. The system of claim 1, wherein the dual-mode module further comprises a printed circuit board (PCB) that comprises antenna elements of at least some of the one or more antennas.

7. The system of claim 6, wherein the antenna elements of at least some of the one or more antennas are implemented on a first side of the PCB and circuitry for controlling operation of the one or more antenna elements is implemented on a second side of the PCB.

8. The system of claim 1, wherein the dual-mode module further comprises one or more phased array controllers.

9. The system of claim 1, wherein the dual-mode module is configured to use one of the first phased array antenna and the second phased array antenna for both of radar transmit and communications transmit and receive.

10. The system of claim 9, wherein the dual-mode module is configured to use the other one of the first phased array antenna and the second phased array antenna for radar reception.

11. The system of claim 1, wherein the dual-mode module is configured to select or arrange two portions of at least one of the first phased array antenna for monopulse radar signal processing.

12. The system of claim 11, wherein the dual-mode module is configured to form two dedicated receive paths for handling monopulse radar signal processing via the two portions.

13. The system of claim 12, wherein the dual-mode module is configured to arrange two separate receive paths based on monopulse radar signal processing, and wherein the arranging comprises utilizing phase for one axis and amplitude using amplitude squinting for second axis.

14. The system of claim 1, wherein the one or one or more processing circuits comprise at least one of phase lock loop (PLL) circuit, an up/down converter circuit, an amplifier circuit, and a mixer circuit.

15. The system of claim 1, wherein the dual-mode module further comprises at least two separate signal processing circuits for handling at least a portion of signal processing functions for each of radar communication and data communication.

16. The system of claim 15, wherein the at least two separate signal processing circuits are implemented in at least two separate integrated circuits.

17. The system of claim 15, wherein the dual-mode module is configured to switch between the two separate signal processing circuits to facilitate switching between the radar mode and the data communications mode.

18. The system of claim 15, wherein the dual-mode module is configured to utilize a frequency plan that supports both of the two separate signal processing circuits.

19. The system of claim 1, wherein the dual-mode module further comprises a field-programmable gate array (FPGA) configured for processing radar waveforms.

20. The system of claim 1, wherein the dual-mode module is configured to utilize or apply time alignment between paths when operating in one or both of the radar mode and the data communications mode, and/or switching between the radar mode and the data communications mode.

21. The system of claim 1, wherein the dual-mode module is configured to switch between the radar mode and the data communications mode based on a switching scheme, wherein the switching scheme comprises use of time division multiplexing (TDM).

22. The system of claim 21, wherein the switching scheme further comprises a higher priority for the radar mode.

23. The system of claim 21, wherein the switching scheme further comprises a higher priority for the data communications mode.

24. The system of claim 1, wherein the dual-mode module is configured to operate at frequencies in one or more millimeter waves (mmWave) bands during at least the radar mode and the data communications mode.

25. The system of claim 24, wherein the dual-mode module is configured to operate at K-band frequencies.

26. The system of claim 1, wherein the one or more antennas comprise an antenna having a plurality of antenna elements, and wherein the first phased array antenna and the second phased array antenna are formed using the plurality of antenna elements.

27. The system of claim 26, wherein the plurality of antenna elements comprises no more than 50 antenna elements.

28. The system of claim 26, wherein the plurality of antenna elements comprises 16 antenna elements.

29. The system of claim 1, wherein the dual-mode module is configured to support mesh networking based communications when operating as a communications module.

* * * * *